US012025907B2

(12) United States Patent
Kamigaki et al.

(10) Patent No.: US 12,025,907 B2
(45) Date of Patent: Jul. 2, 2024

(54) PROJECTION LENS AND PROJECTION DEVICE

(71) Applicant: FUJIFILM Corporation, Tokyo (JP)

(72) Inventors: Tetsuo Kamigaki, Saitama (JP); Hitoshi Shimizu, Saitama (JP); Yasuto Kuroda, Saitama (JP); Hironobu Kayano, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 525 days.

(21) Appl. No.: 17/244,403

(22) Filed: Apr. 29, 2021

(65) Prior Publication Data

US 2021/0247684 A1 Aug. 12, 2021

Related U.S. Application Data

(63) Continuation of application No. PCT/JP2019/043267, filed on Nov. 5, 2019.

(30) Foreign Application Priority Data

Nov. 2, 2018 (JP) ................................ 2018-207738

(51) Int. Cl.
*G03B 21/30* (2006.01)
*G02B 7/02* (2021.01)
*G02B 17/08* (2006.01)

(52) U.S. Cl.
CPC ............. *G03B 21/30* (2013.01); *G02B 7/021* (2013.01); *G02B 17/08* (2013.01)

(58) Field of Classification Search
CPC ...... G03B 21/30; G03B 21/147; G03B 21/28; G02B 7/021; G02B 17/08; G02B 26/008; G02B 7/023; G02B 7/04; H04N 5/74
See application file for complete search history.

(56) References Cited

U.S. PATENT DOCUMENTS

2015/0378135 A1* 12/2015 Lee ...................... G03B 21/142
359/649
2018/0217489 A1* 8/2018 Kuroda ..................... G02B 7/02
(Continued)

FOREIGN PATENT DOCUMENTS

CN    107003497 A    8/2017
JP    59-164126 U    11/1984
(Continued)

OTHER PUBLICATIONS

International Preliminary Report on Patentabiltiy and Written Opinion of the International Searching Authority (Forms PCT/IB/326, PCT/IB/373, and PCT/ISA/237) for International Application No. PCT/JP2019/043267, dated May 14, 2021, with English translation.
(Continued)

*Primary Examiner* — Magda Cruz
(74) *Attorney, Agent, or Firm* — Birch, Stewart, Kolasch & Birch, LLP

(57) ABSTRACT

A projection lens includes a lens barrel that accommodates an optical system from which light incident from the housing exits, and that has a first rotary tube that rotates around an optical axis and a first fixed tube at which the first rotary tube is rotatably mounted; and a first conduction portion for performing electrical conduction, the first conduction portion having a fixed electrode that is provided at the first fixed tube and a rotary electrode that is provided at the first rotary tube and that rotates as a result of rotating the first rotary tube, the rotary electrode being disposed at a position that faces the fixed electrode and contacting the fixed electrode at least at a rotation position that has been preset.

20 Claims, 24 Drawing Sheets

(56) References Cited

U.S. PATENT DOCUMENTS

| | | | |
|---|---|---|---|
| 2019/0137853 A1 | 5/2019 | Takehana | |
| 2019/0219802 A1* | 7/2019 | Kuroda | G02B 13/16 |
| 2019/0219915 A1 | 7/2019 | Kayano | |
| 2019/0346750 A1* | 11/2019 | Kuroda | G02B 27/0955 |
| 2020/0292924 A1* | 9/2020 | Amano | H04N 9/3185 |
| 2021/0208490 A1* | 7/2021 | Shimizu | G03B 21/145 |
| 2021/0247588 A1 | 8/2021 | Kuroda | |

FOREIGN PATENT DOCUMENTS

| | | |
|---|---|---|
| JP | 60-104812 U | 7/1985 |
| JP | 2-151823 A | 6/1990 |
| JP | 7-146445 A | 6/1995 |
| JP | 8-271285 A | 10/1996 |
| JP | 2001-203022 A | 7/2001 |
| JP | 2007-264156 A | 10/2007 |
| JP | 2010-277047 A | 12/2010 |
| JP | 2015-169786 A | 9/2015 |
| JP | 2017-11934 A | 1/2017 |
| JP | 2017-142726 A | 8/2017 |
| WO | WO 2018/055963 A1 | 3/2018 |
| WO | WO 2018/055964 A1 | 3/2018 |

OTHER PUBLICATIONS

International Search Report (Form PCT/ISA/210) for International Application No. PCT/JP2019/043267, dated Jan. 21, 2020, with English translation.

Japanese Office Action for Japanese Application No. 2018-207738, dated Aug. 27, 2019, with English translation.

Japanese Office Action for Japanese Application No. 2018-207738, dated Nov. 5, 2019, with English translation.

Chinese Office Action and Search Report for corresponding Chinese Application No. 201880072427.3, dated Aug. 29, 2022, with English translation.

* cited by examiner

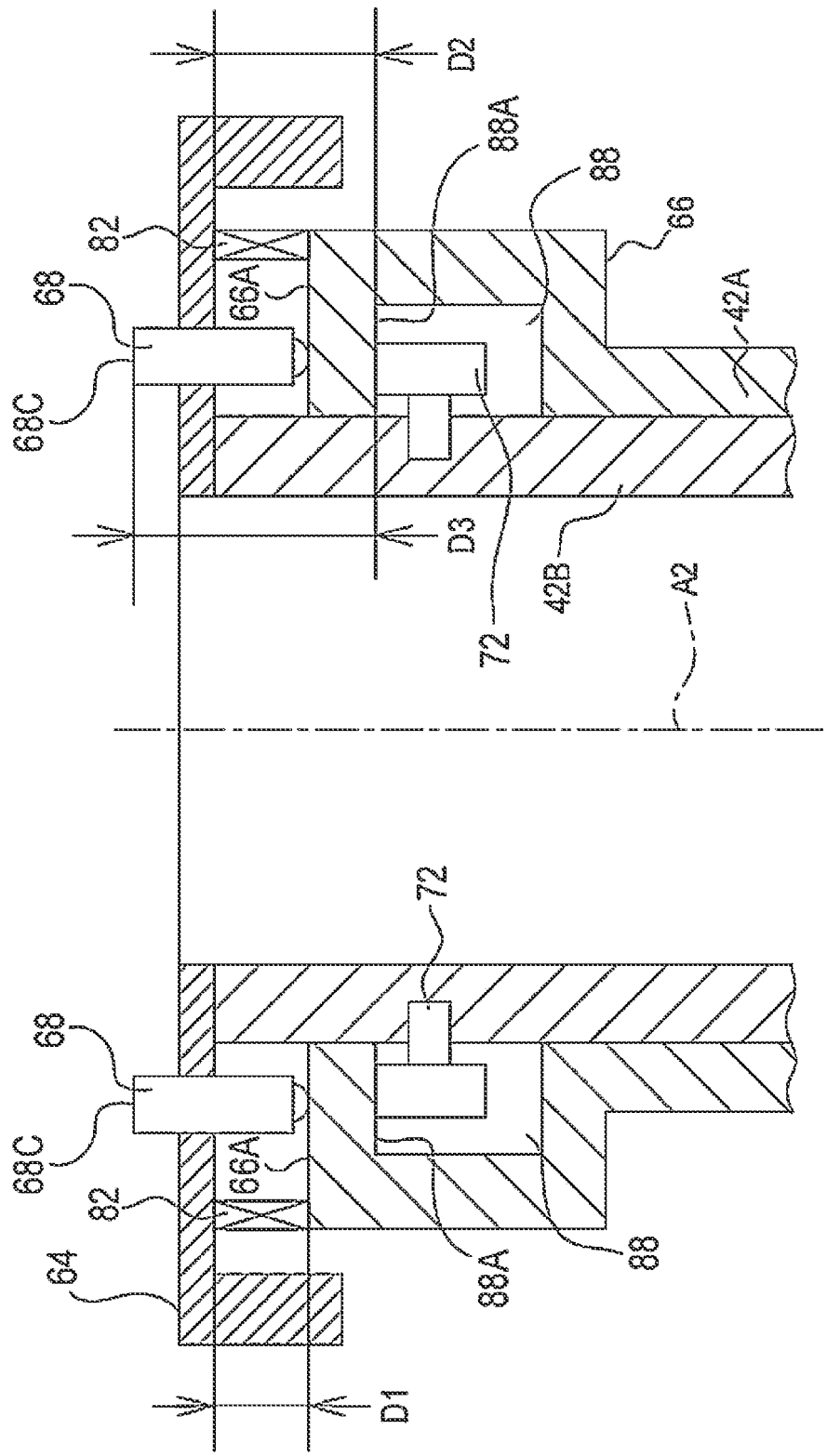

PROJECTION LENS AND PROJECTION DEVICE

CROSS-REFERENCE TO RELATED APPLICATIONS

This application is a continuation application of International Application No. PCT/JP2019/043267, filed on Nov. 5, 2019, which is incorporated herein by reference in its entirety. Further, this application claims priority from Japanese Patent Application No. 2018-207738, filed on Nov. 2, 2018, the disclosure of which is incorporated by reference herein in its entirety.

BACKGROUND

Technical Field

The technology of the present disclosure relates to a projection lens and a projection device.

Related Art

Projectors, which are projection devices that project an image onto a screen, are widely used. Projectors include, for example, an image formation panel, such as a liquid crystal display element (LCD: liquid crystal display) or a DMD (digital micromirror device: registered trademark), and a projection lens that projects onto a screen an image that is formed at the image formation panel.

Among such projectors, a projector including a projection lens that can change a projection direction of an image is being developed (refer to WO2018/055964A). In the projector that is described in WO2018/055964A, the image formation panel is accommodated in a main body portion, and the projection lens is mounted on an outer peripheral surface of the main body portion.

In the projector that is described in WO2018/055964A, a light beam that represents an image formed at the image formation panel is incident upon the projection lens from the main body portion. The projection lens includes a bending optical system having three optical axes that are a first optical axis, a second optical axis, and a third optical axis in this order from an incidence side. The first optical axis is an optical axis that corresponds to a light beam that is incident from the main body portion, and the second optical axis is bent by 90° with respect to the first optical axis. The third optical axis is bent by 90° with respect to the second optical axis, and is an exit optical axis along which a light beam exits toward a screen.

The projection lens has an incidence-side end portion, an intermediate portion, and an exit-side end portion. The incidence-side end portion corresponds to the first optical axis. The intermediate portion corresponds to the second optical axis. The exit-side end portion corresponds to the third optical axis. The incidence-side end portion is nonrotatably mounted with respect to the main body portion, and the intermediate portion rotates around the first optical axis with respect to the incidence-side end portion. The exit-side end portion is connected to the intermediate portion, and, when the intermediate portion rotates, the exit-side end portion also rotates around the first optical axis. The exit-side end portion rotates around the second optical axis with respect to the intermediate portion. In this way, due to the exit-side end portion rotating around the first optical axis and the second optical axis, the projection direction is changed.

In such a projection lens, for example, in order to rotate the exit-side end portion with respect to the intermediate portion, a lens barrel that accommodates the bending optical system has a rotary tube that rotates around an optical axis that extends through the intermediate portion and a fixed tube on which the rotary tube is rotatably mounted.

For example, an electrical driving unit, such as a focus motor that is used in focusing, is provided at such a lens barrel. When the electrical driving unit is provided at the exit-side end portion, in order to drive the electrical driving unit, a conduction portion for sending electrical power and control signals from a power supply and a control board provided at the main body portion is required.

When a cable is used as the conduction portion, disposing the cable over both the rotary tube and the fixed tube results in the problem that the cable is twisted as a result of rotating the rotary tube. Such a problem becomes particularly serious when a rotatable range of the rotary tube becomes 3600 or greater.

SUMMARY

An object of the technology of the present disclosure is to provide a projection lens and a projection device, in which, in the projection lens that requires electrical conduction on a side of a rotary tube and on a side of a fixed tube, even when a rotatable range of the rotary tube is 3600 or greater, there is no concern about a cable being twisted.

A projection lens of the present disclosure is a projection lens that is to be mounted on a housing of a projection device having an electro-optical element, and that includes a lens barrel and a first conduction portion. The lens barrel accommodates an optical system from which light incident from the housing exits, and has a first rotary tube that rotates around an optical axis and a first fixed tube at which the first rotary tube is rotatably mounted. The first conduction portion is provided for performing electrical conduction, and has a fixed electrode that is provided at the first fixed tube and a rotary electrode that is provided at the first rotary tube and that rotates as a result of rotating the first rotary tube, the rotary electrode being disposed at a position that faces the fixed electrode and contacting the fixed electrode at least at a rotation position that has been preset.

It is desirable that one of the fixed electrode and the rotary electrode be a planar electrode that extends in a peripheral direction around the optical axis, and the other of the fixed electrode and the rotary electrode be a partial contact electrode that partially contacts the planar electrode, and that the planar electrode and the partial contact electrode while being kept in a contact state rotate relative to each other.

It is desirable that the partial contact electrode in an elastically deformed state contact the planar electrode.

It is desirable that a plurality of the partial contact electrodes be provided, and that the plurality of the partial contact electrodes be disposed apart from each other in the peripheral direction around the optical axis.

It is desirable that one of the fixed electrode and the rotary electrode be a conductive projection portion having a conductive film, and the other of the fixed electrode and the rotary electrode be an elastic conductive portion that elastically deforms, and that, at the rotation position, the conductive projection portion and the elastic conductive portion contact each other.

It is desirable that the projection lens include a rotary portion that is mounted at the first rotary tube and that rotates as a result of rotating the first rotary tube, and that the rotary electrode be mounted at the rotary portion.

It is desirable that the fixed electrode and the rotary electrode be disposed so as to face each other in a direction of the optical axis, and that the projection lens include a first protrusion portion, a first abutment surface, and a first pressing portion. The first protrusion portion is provided at one of the first rotary tube and the first fixed tube and protrudes from the one of the first rotary tube and the first fixed tube. The first abutment surface is provided at the other of the first rotary tube and the first fixed tube and faces and abuts upon the first protrusion portion. The first pressing portion presses the first protrusion portion against the first abutment surface by pressing at least one of the first rotary tube or the first fixed tube in the direction of the optical axis.

It is desirable that the first pressing portion be provided at one of the first rotary tube and the first fixed tube, and that the projection lens include a first press surface and at least one first fitting hole. The first press surface is provided at the other of the first rotary tube and the first fixed tube, is disposed so as to face the first pressing portion in the direction of the optical axis, and is pressed by the first pressing portion. The at least one first fitting hole is provided in the first press surface and is fitted to the first pressing portion. In addition, here, it is desirable that, when the first rotary tube rotates around the optical axis, a state of the first pressing portion be switched between a fitting state in which the first pressing portion is fitted to the first fitting hole and a move-out state in which the first pressing portion moves out of the first fitting hole.

It is desirable that, with respect to the optical axis, the first conduction portion be disposed on an outer side with respect to the first pressing portion.

It is desirable that the optical system be a bending optical system that includes at least two optical axes, the two optical axes being an exit-side optical axis along which the light incident from the housing exits and a first incidence-side optical axis that is disposed on an incidence side with respect to the exit-side optical axis and that is bent with respect to the exit-side optical axis, and that the lens barrel include an exit-side lens barrel portion that accommodates an exit-side optical system having the exit-side optical axis and that rotates around the first incidence-side optical axis, and a first incidence-side lens barrel portion that is disposed on an incidence side with respect to the exit-side lens barrel portion and through which the first incidence-side optical axis extends, the first incidence-side lens barrel portion having the first rotary tube and the first fixed tube, the first rotary tube rotating around the first incidence-side optical axis as a result of rotating the exit-side lens barrel portion.

It is desirable that the bending optical system include a second incidence-side optical axis that is disposed on an incidence side with respect to the first incidence-side optical axis and that is bent with respect to the first incidence-side optical axis, and the projection lens further include a second incidence-side lens barrel portion that is disposed on an incidence side with respect to the first incidence-side lens barrel portion and through which the second incidence-side optical axis extends, the second incidence-side lens barrel portion having a second rotary tube that rotates around the second incidence-side optical axis as a result of rotating the first incidence-side lens barrel portion and a second fixed tube at which the second rotary tube is rotatably mounted.

It is desirable that the projection lens include a second conduction portion for performing electrical conduction on a side of the second rotary tube and on a side of the second fixed tube.

It is desirable that a rotatable range of the first rotary tube with respect to the first fixed tube be 360° or greater, that a rotatable range of the second rotary tube with respect to the second fixed tube be less than 360°, and the second conduction portion be a cable-type conduction portion.

It is desirable that the projection lens include a rotation-position detection mechanism that detects a rotation position of the first rotary tube, the rotation-position detection mechanism have a pattern formation portion that is formed by a plurality of patterns that differ at each rotation position and a photosensor that optically reads the plurality of patterns, and that the pattern formation portion and the photosensor rotate relative to each other as a result of rotating the first rotary tube.

A projection device of the present disclosure includes any of the projection lenses above.

A different projection lens of the present disclosure is desirably a projection lens that is to be mounted on a housing of a projection device having an electro-optical element, and that includes a bending optical system, a lens barrel, a first conduction portion, and a second conduction portion. The bending optical system has a first optical axis for light that is incident from the housing, a second optical axis that is bent with respect to the first optical axis, and a third optical axis that is bent with respect to the second optical axis. The lens barrel has a first lens barrel portion through which the first optical axis extends, a second lens barrel portion through which the second optical axis extends, and a third lens barrel portion through which the third optical axis extends and that accommodates an exit optical system from which light exits, the third lens barrel portion rotating around the second optical axis with respect to the second lens barrel portion, the second lens barrel portion having a first rotary tube that rotates as a result of rotating the third lens barrel portion and a first fixed tube at which the first rotary tube is rotatably mounted, and the second lens barrel portion rotating around the first optical axis with respect to the first lens barrel portion, and the first lens barrel portion having a second rotary tube that rotates as a result of rotating the second lens barrel portion and a second fixed tube at which the second rotary tube is rotatably mounted. The first conduction portion is provided for performing electrical conduction between a side of the first rotary tube and a side of the first fixed tube. The second conduction portion is provided for performing electrical conduction between a side of the second rotary tube and a side of the second fixed tube. In the projection lens, it is desirable that a rotatable range of the first rotary tube with respect to the first fixed tube be 360° or greater, a rotatable range of the second rotary tube with respect to the second fixed tube be less than 360°, the first conduction portion be a cableless-type conduction portion, and the second conduction portion be a cable-type conduction portion.

A different projection device of the present disclosure includes the projection lens above, in which the housing has a central portion, a protrusion portion, and a recessed portion that is adjacent to the protrusion portion, and in which the projection lens is disposed in the recessed portion.

According to the present disclosure, in the projection lens that requires electrical conduction on the side of the rotary tube and on the side of the fixed tube, even when the rotatable range of the rotary tube is 3600 or greater, there is no concern about a cable being twisted.

BRIEF DESCRIPTION OF THE DRAWINGS

FIG. 18 is a schematic view of the first engaging portions;

DESCRIPTION OF THE PREFERRED EMBODIMENTS

An example of an embodiment of the technology of the present disclosure is described below with reference to the drawings.

Note that terms, such as "first", "second", and "third", used in the present specification are added to avoid confusion between structural elements, and do not limit the number of structural elements that exist in a projector or a lens.

Figure 1:
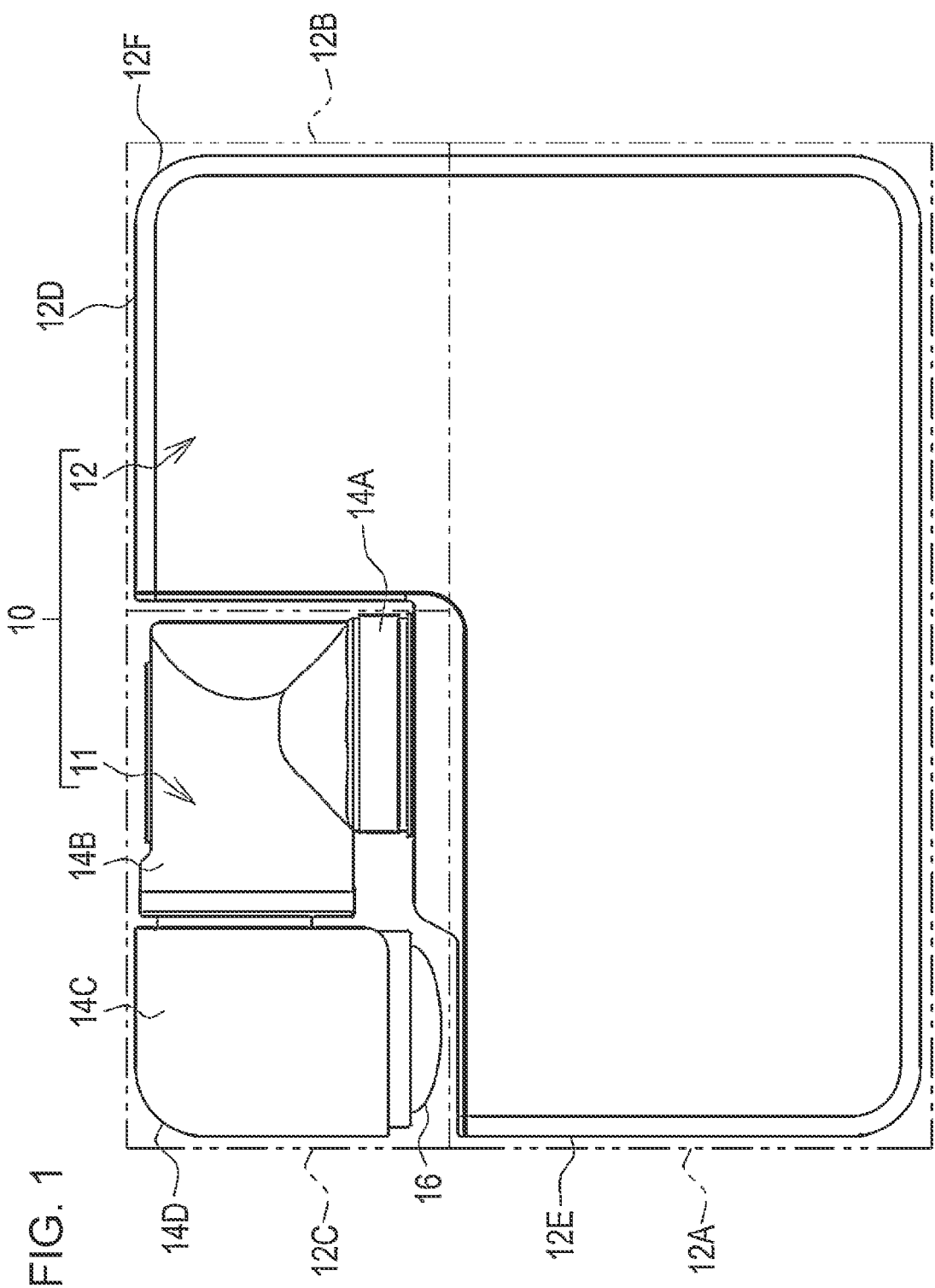
FIG. 1 is a plan view of a projector.

As illustrated in FIG. 1, a projector 10 of the present embodiment corresponds to a projection device, and includes a projection lens 11 and a main body portion 12. One end portion of the projection lens 11 is mounted on the main body portion 12. FIG. 1 illustrates the projection lens 11 in an accommodated state when the projector 10 is not used.

The main body portion 12 includes a base portion 12A, a protrusion portion 12B, and an accommodation portion 12C. The base portion 12A accommodates main components, such as an image formation unit 26 (refer to FIG. 4) and a control board (not illustrated).

The base portion 12A corresponds to a central portion. In plan view of FIG. 1, the base portion 12A has a substantially rectangular shape that is long sideways. The protrusion portion 12B protrudes from one side of the base portion 12A. The protrusion portion 12B has a substantially rectangular shape, and the width of the protrusion portion 12B is about half of the length of the one side of the base portion 12A. Therefore, the main body portion 12 has a substantially L shape in plan view as a whole in which the base portion 12A and the protrusion portion 12B are combined.

The accommodation portion 12C accommodates the projection lens 11. In FIG. 1, the accommodation portion 12C is a space that is provided on the left side of the protrusion portion 12B, and has a substantially rectangular shape in plan view similarly to the protrusion portion 12B. That is, in FIG. 1, it is assumed that, of an outer peripheral surface of the main body portion 12, an upper-side side surface 12D and a left-side side surface 12E are extended in a direction in which the side surface 12D and the side surface 12E intersect each other. A space that is defined by the extended side surfaces 12D and 12E as outer edges is the accommodation portion 12C. Therefore, although the main body portion 12 has a substantially L shape in terms of a single body, when the main body portion 12 is seen as a whole in which the accommodation portion 12C is included, the main body portion 12 has a substantially rectangular shape in plan view. Since the accommodation portion 12C can also be seen as a portion that is recessed toward a side of the base portion 12A with respect to the height of the protrusion portion 12B when the projector 10 is vertically placed, the accommodation portion 12C corresponds to a recessed portion.

When the projector 10 is not used, the projection lens 11 is accommodated in the accommodation portion 12C with the projection lens 11 being deformed so as not to protrude from the rectangular accommodation portion. Therefore, as illustrated in FIG. 1, in the accommodated state, the projector 10 has a substantially rectangular parallelepiped shape with reduced irregularity in the outer peripheral surface as a whole in which the L-shaped main body portion 12 and the projection lens 11 are combined. Consequently, in the accommodated state, the projector 10 is easily carried and accommodated.

A light beam that represents an image formed by the image formation unit 26 is incident upon the projection lens 11 from the main body portion 12. The projection lens 11 forms an image by enlarging image light based on the incident light beam by an optical system. Therefore, the projection lens 11 projects onto a screen 36 (refer to FIG. 4) an enlarged image of the image formed by the image formation unit 26.

The projection lens 11 has, for example, a bending optical system (refer to FIGS. 2 and 3) that bends an optical axis twice, and, in the accommodated state illustrated in FIG. 1, the projection lens 11 has a substantially U shape with a convex shape on an upper side as a whole. The projection lens 11 includes an incidence-side end portion 14A, an intermediate portion 14B, and an exit-side end portion 14C. The incidence-side end portion 14A is connected to one end of both ends of the intermediate portion 14B, and the exit-side end portion 14C is connected to the other end of both the ends of the intermediate portion 14B. Light from the main body portion 12 is incident upon the incidence-side end portion 14A. An exit lens 16 is provided at the exit-side end portion 14C. The light incident upon the incidence-side end portion 14A from the main body portion 12 is guided to the exit-side end portion 14C via the intermediate portion 14B. The exit-side end portion 14C allows the light that has been guided from the main body portion 12 via the incidence-side end portion 14A and the intermediate portion 14B to exit from the exit lens 16 toward the screen 36.

The incidence-side end portion 14A is mounted on the main body portion 12. A position where the incidence-side end portion 14A is mounted is, in a left-right direction in FIG. 1, adjacent to the protrusion portion 12B and near the center of the base portion 12A. In the accommodated state of the projection lens 11, the intermediate portion 14B extends toward a side of an end portion opposite to the protrusion portion 12B, that is, toward the left in FIG. 1 from a position near the center of the base portion 12A. A corner portion 14D of the exit-side end portion 14C and a corner portion 12F of the protrusion portion 12B are disposed at positions that are substantially symmetrical in the left-right direction in FIG. 1.

The outer shape of the exit-side end portion 14C is formed so as to be substantially the same as the outer shape of the protrusion portion 12B, and the outer shape of the projection lens 11 and the outer shape of the main body portion 12 are made common. Therefore, in the accommodated state, the outer shape of the projection lens 11 is designed as if the outer shape of the projection lens 11 constitutes a part of the outer shape of the main body portion 12.

Figure 2:
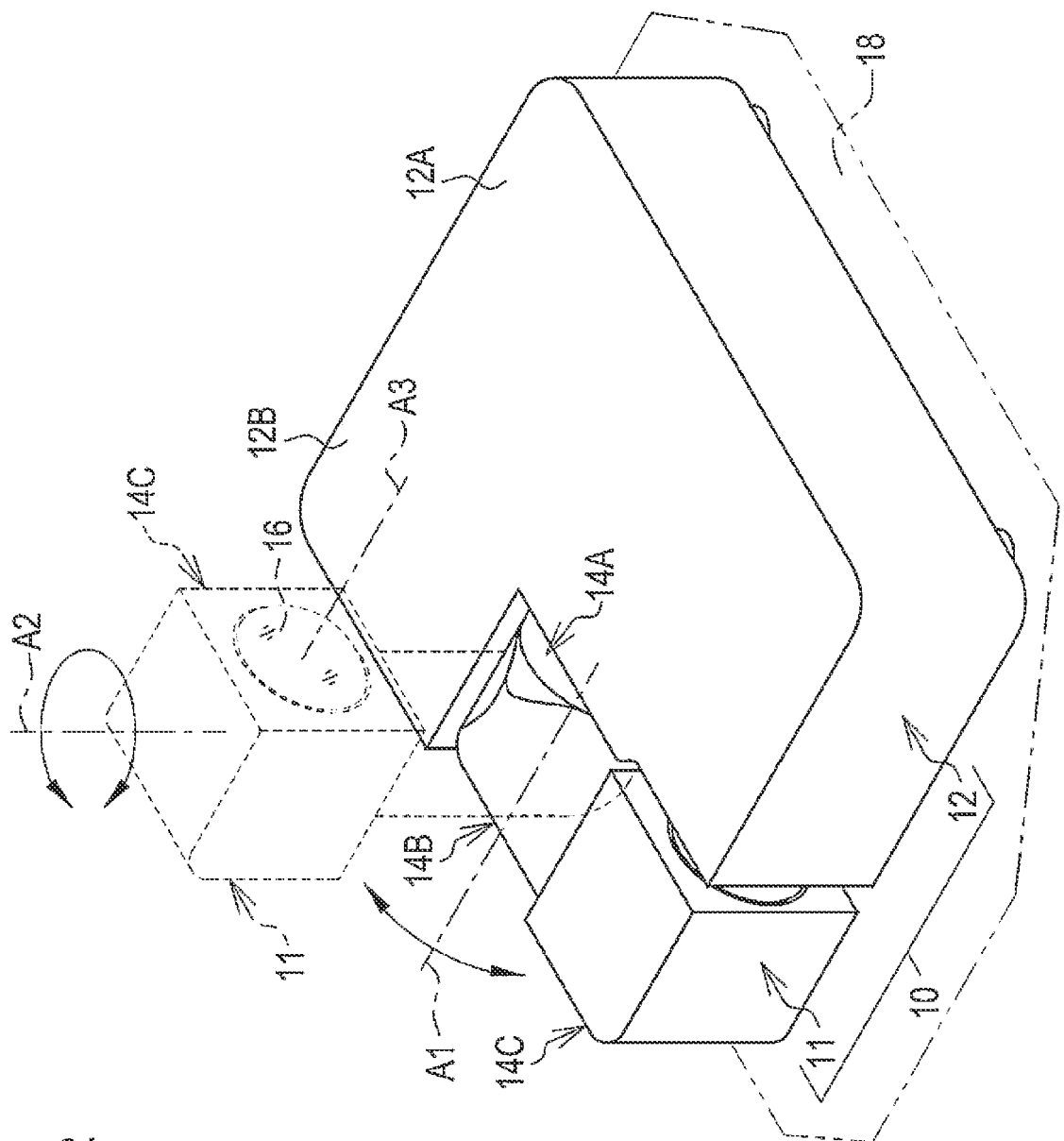
FIG. 2 is a perspective view of the projector in a horizontally placed state.
Figure 3:
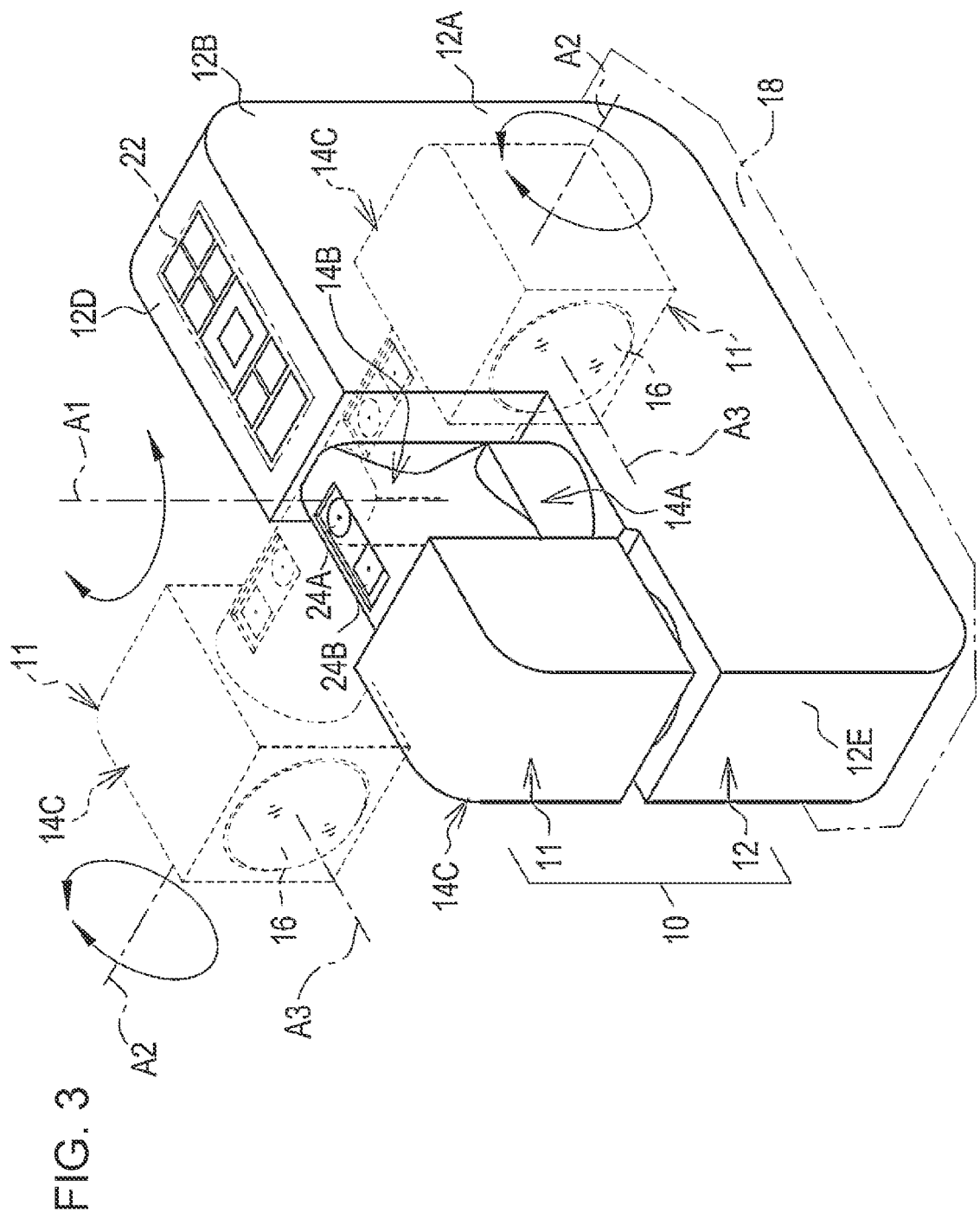
FIG. 3 is a perspective view of the projector in a vertically placed state.

As illustrated in FIGS. 2 and 3, the projection lens 11 includes the bending optical system. The bending optical system has a first optical axis A1, a second optical axis A2, and a third optical axis A3. The second optical axis A2 is an optical axis that is bent by 90° with respect to the first optical axis A1. The third optical axis A3 is an optical axis that is bent by 90° with respect to the second optical axis A2.

The incidence-side end portion 14A is nonrotatably mounted with respect to the main body portion 12. The intermediate portion 14B is rotatable around the first optical axis A1 with respect to the incidence-side end portion 14A. Since the exit-side end portion 14C is connected to the intermediate portion 14B, when the intermediate portion 14B rotates with respect to the incidence-side end portion 14A, the exit-side end portion 14C also rotates around the first optical axis A1. A rotatable range around the first optical axis A1 is less than 360°, and, in the present example, is 180°. The rotatable range around the first optical axis A1 is limited to less than 360° for preventing interference between the protrusion portion 12B and the projection lens 11 in a state in which the protrusion portion 12B is adjacent to the incidence-side end portion 14A.

The exit-side end portion 14C is rotatable around the second optical axis A2 with respect to the intermediate portion 14B. Unlike the intermediate portion 14B, the rotation of the exit-side end portion 14C around the second optical axis A2 is not limited. For example, the exit-side end portion 14C can also be rotated by 3600 or greater.

In summary, the exit-side end portion 14C is rotatable around two rotational axes that are the first optical axis A1 and the second optical axis A2. Therefore, a user can change a projection direction of the projection lens 11 without moving the main body portion 12.

FIG. 2 illustrates the projector 10 in a horizontally placed state with respect to an installation surface 18, and FIG. 3 illustrates the projector 10 in a vertically placed state with respect to the installation surface 18. In this way, the projector 10 can be used in a horizontally placed orientation and in a vertically placed orientation.

As illustrated in FIG. 3, an operation panel 22 is provided at the side surface 12D of the protrusion portion 12B. The operation panel 22 has a plurality of operation switches. The operation switches are, for example, a power switch and adjustment switches. The adjustment switches are switches for performing various types of adjustments. Examples of adjustment switches include switches for adjusting image quality of an image that has been projected onto the screen 36 and performing trapezoidal correction.

A first unlocking switch 24A and a second unlocking switch 24B are provided at one surface of the intermediate portion 14B. A first rotation locking mechanism and a second rotation locking mechanism are provided at the projection lens 11. The first rotation locking mechanism locks the rotation of the intermediate portion 14B around the first optical axis A1 with respect to the incidence-side end portion 14A. The second rotation locking mechanism locks the rotation of the exit-side end portion 14C around the second optical axis A2 with respect to the intermediate portion 14B. The first unlocking switch 24A is an operation switch for inputting to the first rotation locking mechanism an instruction to unlock the rotation of the intermediate portion 14B. The second unlocking switch 24B is an operation switch for inputting to the second rotation locking mechanism an instruction to unlock the rotation of the exit-side end portion 14C.

Figure 4:
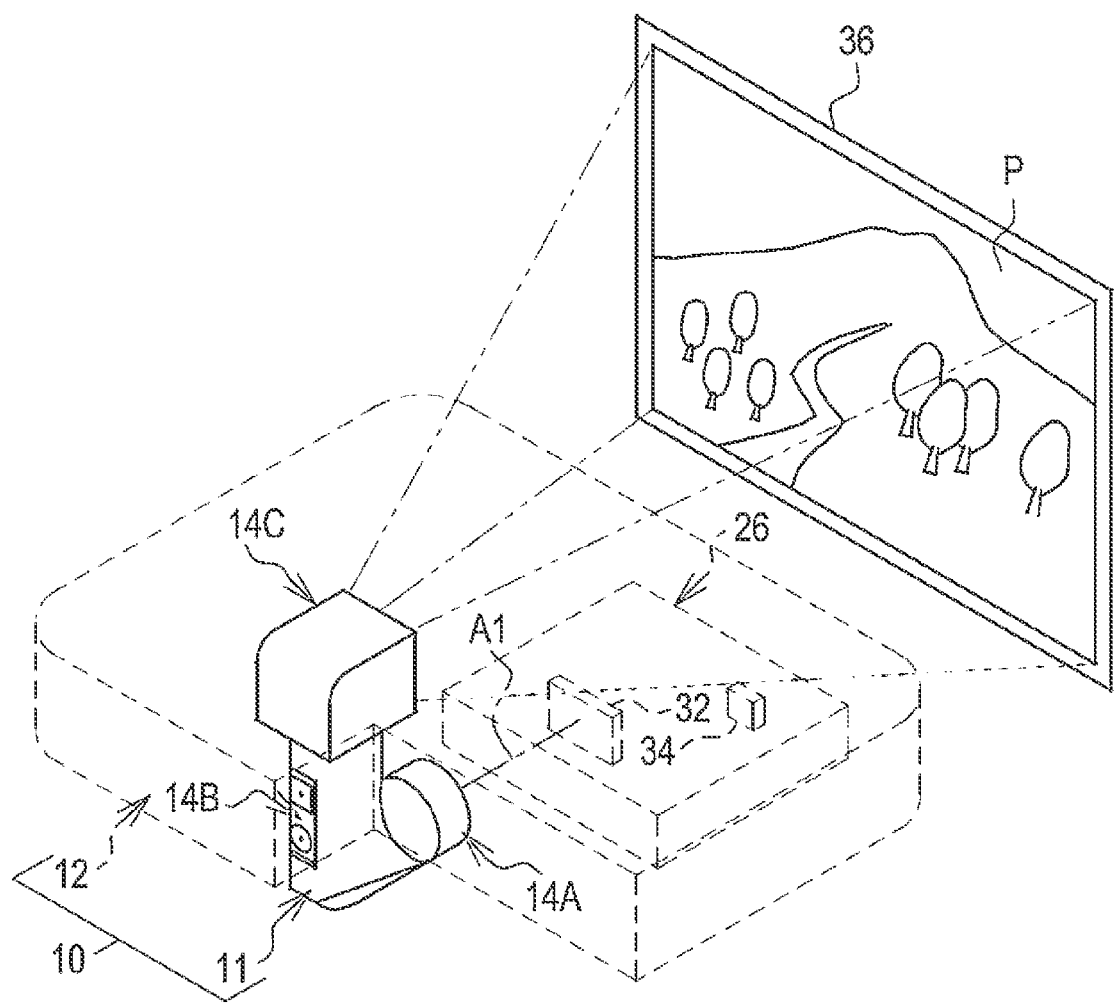
FIG. 4 illustrates a state in which an image is projected onto a screen by using the projector.

As illustrated in FIG. 4, the image formation unit 26 is provided in the main body portion 12. The image formation unit 26 forms an image to be projected. The image formation unit 26 includes, for example, an image formation panel 32, a light source 34, and a light guide member (not illustrated). The image formation panel 32 is an example of an electro-optical element.

The light source 34 emits light to the image formation panel 32. The light guide member guides the light from the light source 34 to the image formation panel 32. The image formation unit 26 is, for example, a reflective-type image formation unit that uses a DMD as the image formation panel 32. As is well known, the DMD has a plurality of micromirrors that are capable of changing a reflection direction of the light that is emitted from the light source 34, and is an image display element in which each micromirror is disposed two-dimensionally in a pixel unit. The DMD, by switching an on/off state of reflected light of the light from the light source 34 as a result of changing the orientation of each micromirror in accordance with an image, performs light modulation in accordance with the image.

An example of the light source 34 is a white light source. The white light source emits white light. The white light source is, for example, a light source that is realized by combining a laser light source and a fluorescent body. The laser light source emits blue light, as excitation light, with respect to the fluorescent body. The fluorescent body emits yellow light by being excited by the blue light emitted from the laser light source. The white light source emits the white light by combining the blue light that is emitted from the laser light source and the yellow light that is emitted from the fluorescent body. A rotary color filter that selectively converts by time division the white light that is emitted by the light source 34 into each colored light ray, that is, a blue light B (Blue) ray, a green light G (Green) ray, and a red light R (Red) ray is further provided at the image formation unit 26. Each of the colored light B, G, and R rays selectively illuminates the image formation panel 32 to obtain image light rays carrying pieces of image information about the respective colors of B, G, and R. The image light rays of the respective colors obtained in this way are selectively incident upon the projection lens 11 and thus are projected toward the screen 36. The image light rays of the respective colors are combined on the screen 36 and a full-color image P is displayed on the screen 36.

Figure 5:
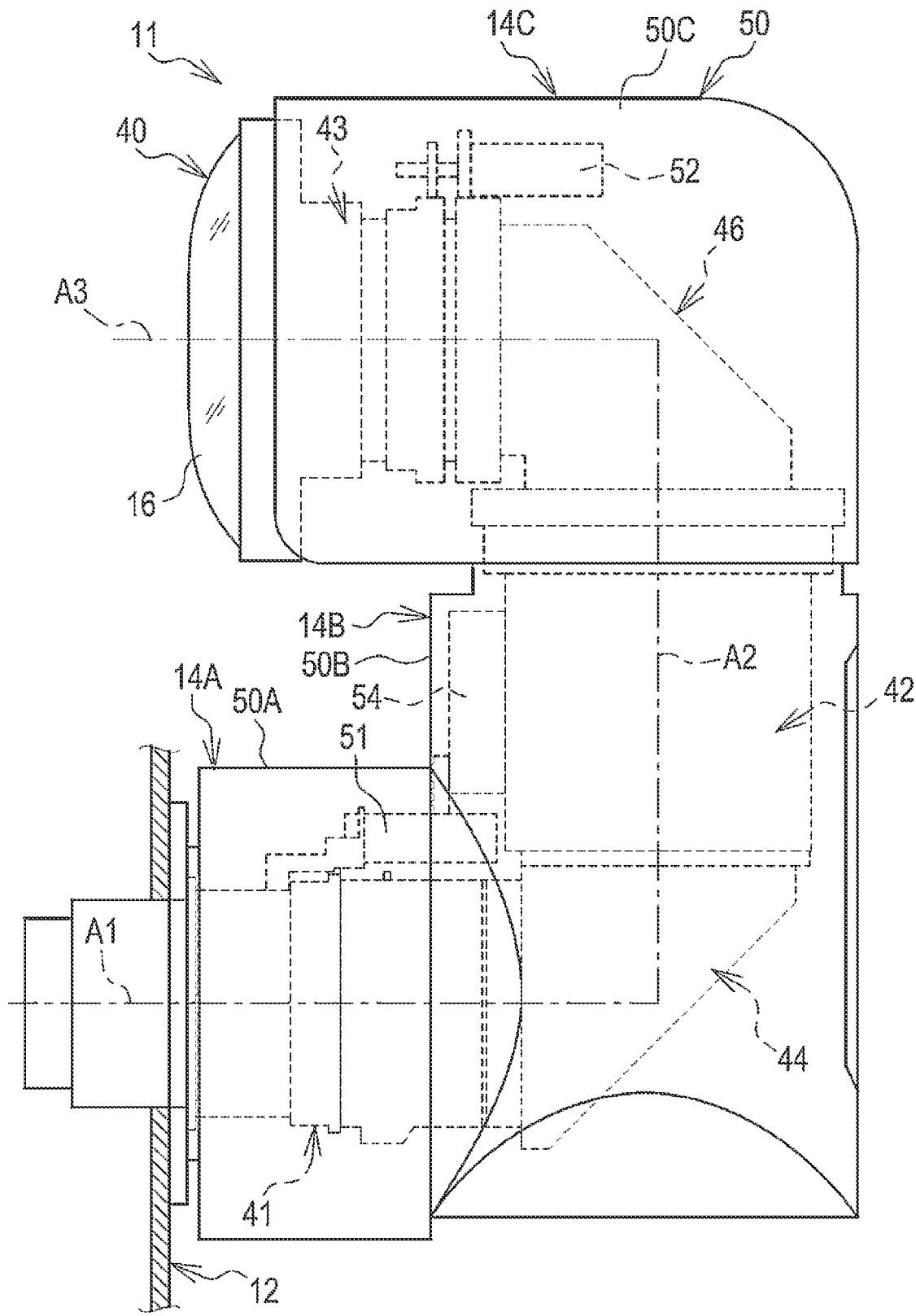
FIG. 5 is a side view of a projection lens.
Figure 6:
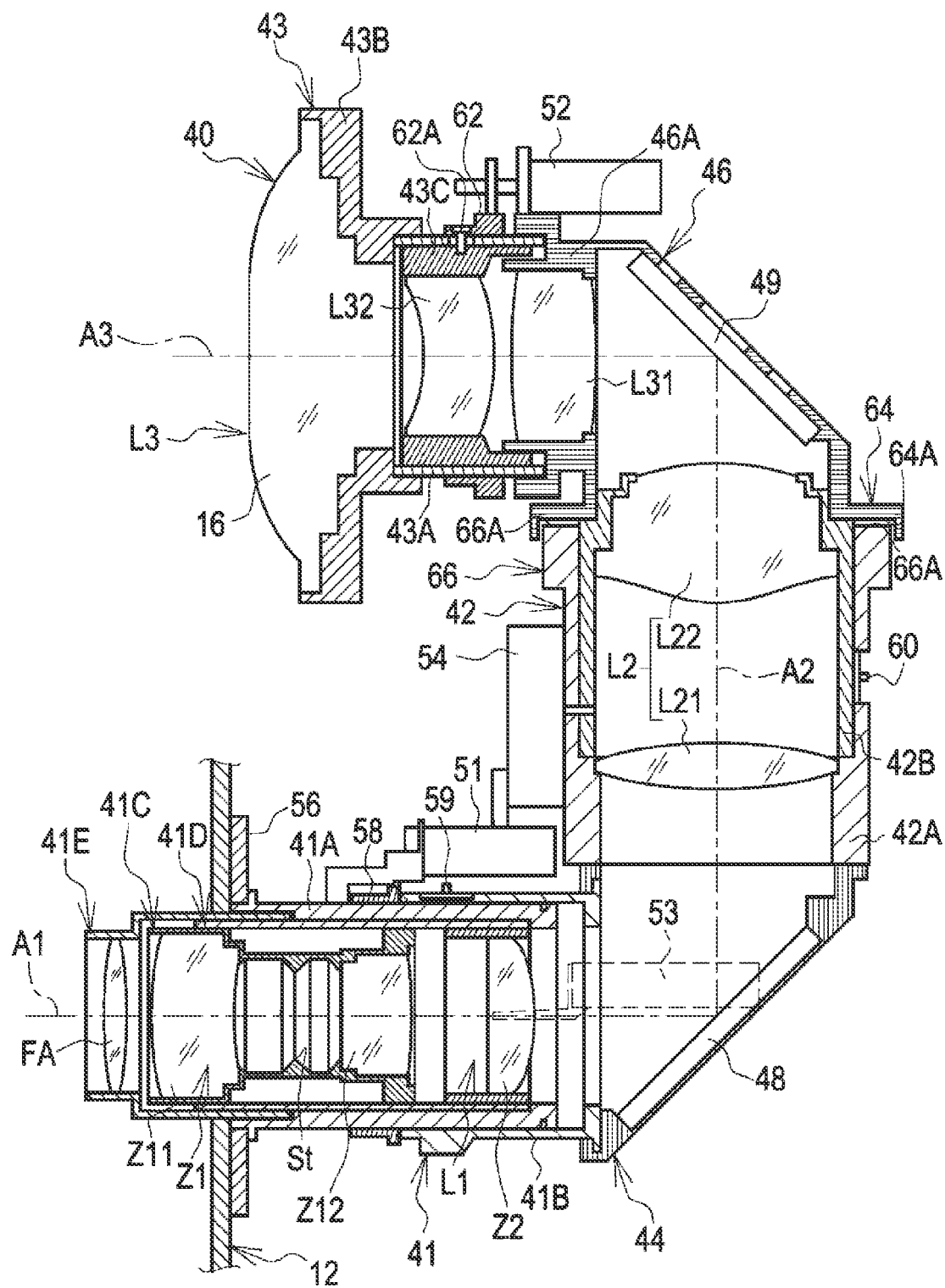
FIG. 6 is a vertical sectional view of the projection lens.

As illustrated in FIGS. 5 and 6, the projection lens 11 includes a lens barrel 40. The lens barrel 40 accommodates the bending optical system. The lens barrel 40 includes a first lens barrel portion 41, a second lens barrel portion 42, and a third lens barrel portion 43. The first lens barrel portion 41, the second lens barrel portion 42, and the third lens barrel portion 43 each accommodate a lens. The lens that is accommodated in the first lens barrel portion 41 is disposed on the first optical axis A1. The lens that is accommodated in the second lens barrel portion 42 is disposed on the second optical axis A2. The lens that is accommodated in the third lens barrel portion 43 is disposed on the third optical axis A3. A center axis of the first lens barrel portion 41 substantially coincides with the first optical axis A1. A center axis of the second lens barrel portion 42 substantially coincides with the second optical axis A2. A center axis of the third lens barrel portion 43 substantially coincides with the third optical axis A3. FIGS. 5 and 6 illustrate the lens barrel 40 in the states illustrated in FIGS. 2 and 4. Note that, in the present embodiment, in order to simplify the description, each lens is described as if each lens is one lens with a detailed structure of each lens being omitted. However, each lens may be a plurality of lenses.

The first lens barrel portion 41 is a lens barrel portion that is positioned on a most incidence side, the third lens barrel portion 43 is a lens barrel portion that is positioned on a most exit-side, and the second lens barrel portion 42 is a lens barrel portion that is positioned between the first lens barrel portion 41 and the third lens barrel portion 43.

Further, the lens barrel 40 includes a first mirror holding portion 44 and a second mirror holding portion 46. The first mirror holding portion 44 holds a first mirror 48, and the second mirror holding portion 46 holds a second mirror 49. The first mirror 48 and the second mirror 49 are each one optical element that constitutes the bending optical system, and are each a reflective portion that bends an optical axis. The first mirror 48 forms the second optical axis A2 by bending the first optical axis A1. The second mirror 49 forms the third optical axis A3 by bending the second optical axis A2. The first mirror holding portion 44 is disposed between the first lens barrel portion 41 and the second lens barrel portion 42. The second mirror holding portion 46 is disposed between the second lens barrel portion 42 and the third lens barrel portion 43.

An end portion of an inner tube 42B of the second lens barrel portion 42 and a lens L22 that is held by the end portion are disposed in an inner portion of the second mirror holding portion 46. Therefore, the distance between the lens L22 and the second mirror 49 is reduced, and, even if the second mirror 49 is reduced in size, the second mirror 49 is capable of reflecting light from the lens L22. A reduction in size of the second mirror 49 makes it possible to also reduce the size of the second mirror holding portion 46.

The lens barrel 40 is covered with an external cover 50, excluding a part thereof, such as the exit lens 16. The external cover 50 has a first external cover 50A, a second external cover 50B, and a third external cover 50C. The first external cover 50A is an external cover that corresponds to the incidence-side end portion 14A, the second external cover 50B is an external cover that corresponds to the intermediate portion 14B, and the third external cover 50C is an external cover that corresponds to the exit-side end portion 14C.

The first external cover 50A covers the first lens barrel portion 41, and constitutes an outer peripheral surface of the incidence-side end portion 14A. The second external cover 50B primarily covers the first mirror holding portion 44 and the second lens barrel portion 42, and constitutes an outer peripheral surface of the intermediate portion 14B. The third external cover 50C primarily covers the second mirror holding portion 46 and the third lens barrel portion 43, and constitutes an outer peripheral surface of the exit-side end portion 14C.

Figure 7:
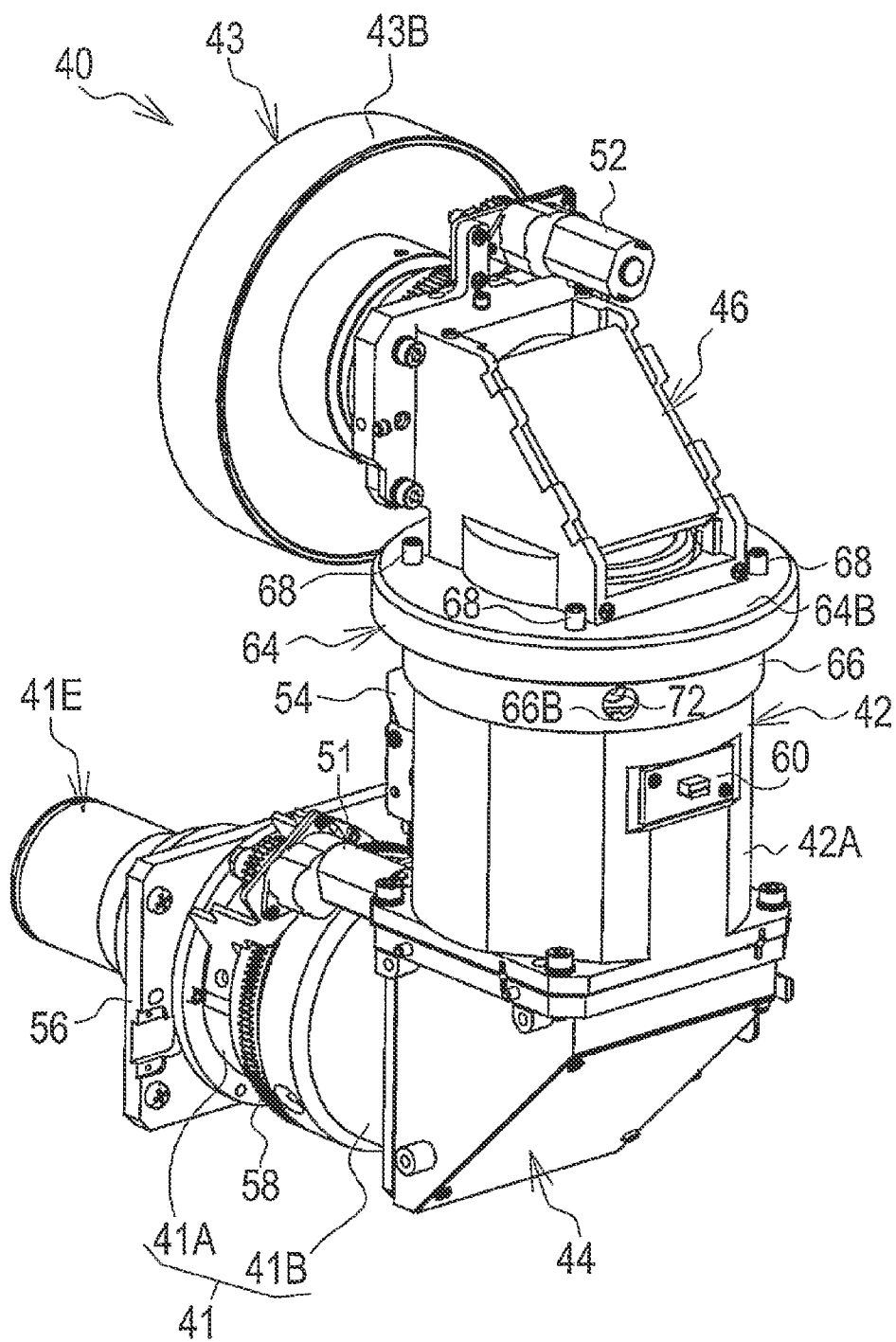
FIG. 7 is an external perspective view of the projection lens.
Figure 8:
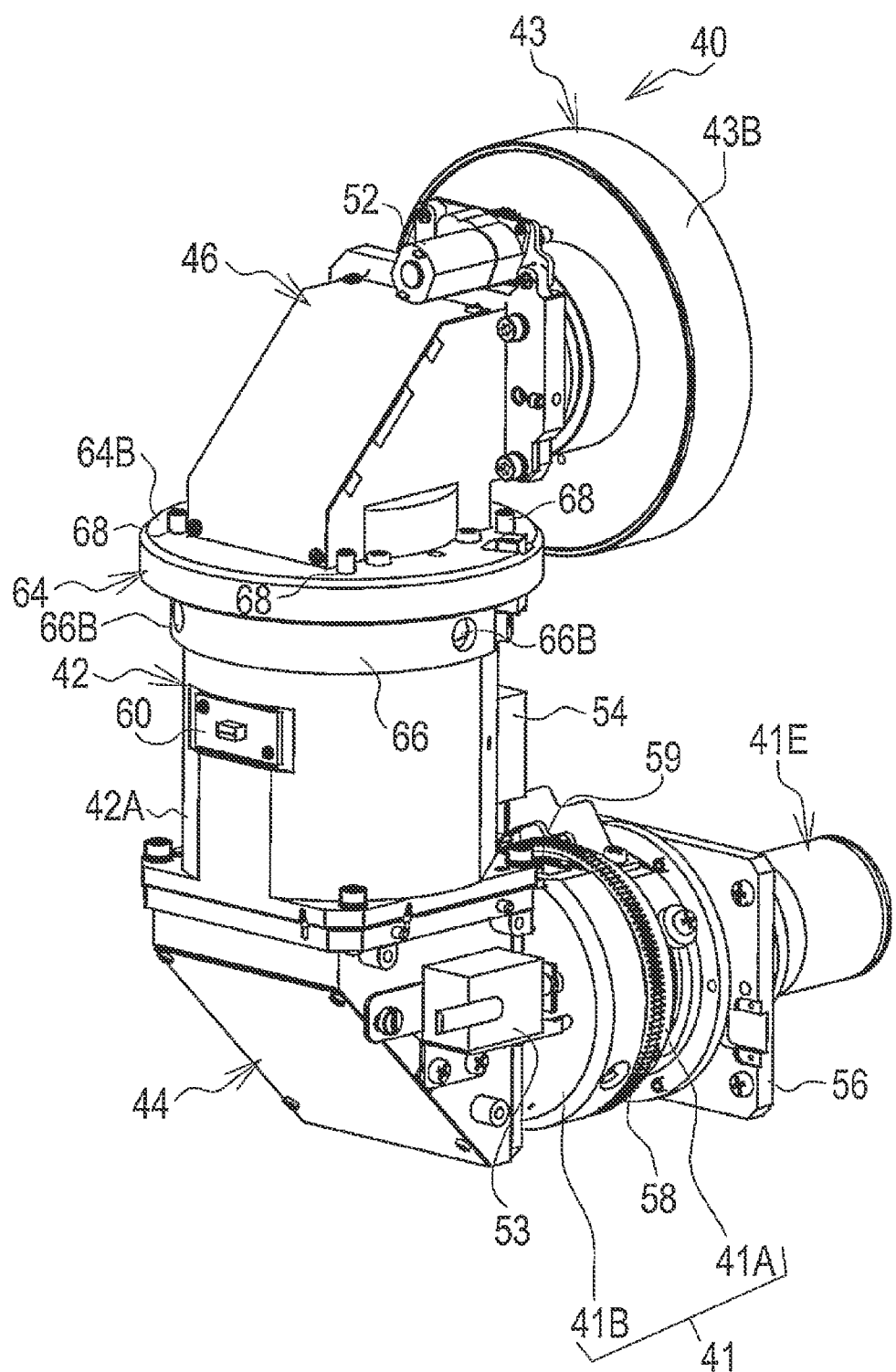
FIG. 8 is an external perspective view of a projection lens that differs from the projection lens in FIG. 7.

As illustrated in FIGS. 7 and 8, various types of actuators are disposed at an outer peripheral surface of the lens barrel 40. Specifically, a zoom motor 51 is provided at an outer peripheral surface of the first lens barrel portion 41, and a focus motor 52 is provided at an outer peripheral surface of the second mirror holding portion 46. A solenoid 53 (also refer to FIG. 6) is provided at an outer peripheral surface of the first mirror holding portion 44, and a solenoid 54 (also refer to FIG. 6) is provided at an outer peripheral surface of the second lens barrel portion 42. The solenoid 53 constitutes the first rotation locking mechanism. The solenoid 54 constitutes the second rotation locking mechanism. The zoom motor 51, the focus motor 52, the solenoid 53, and the solenoid 54 are examples of electrical driving units.

In FIG. 6, the first lens barrel portion 41 includes an inner tube 41A, an outer tube 41B, a zoom-lens barrel 41C, a cam tube 41D, and a focus adjustment tube 41E. A flange 56 that protrudes outward in a radial direction of the inner tube 41A is provided at an incidence-side end portion at the first optical axis A1 of the inner tube 41A. The flange 56 nonrotatably fixes the inner tube 41A with respect to the main body portion 12. The outer tube 41B is disposed on an exit side of the inner tube 41A, and covers a part of an outer peripheral surface of the inner tube 41A. The outer tube 41B is mounted so as to be rotatable around the first optical axis A1 with respect to the inner tube 41A.

The first lens barrel portion 41 holds a first optical system L1. The first optical system L1 is constituted by, for example, a lens FA, a lens group Z1, and a lens Z2, and is disposed on the first optical axis A1. The lens group Z1 is constituted by a lens Z11 and a lens Z12. The cam tube 41D and the zoom-lens barrel 41C are accommodated in the inner tube 41A. The zoom-lens barrel 41C has two groups of zoom lenses. The two groups of zoom lenses are constituted by the lens group Z1 and the lens Z2.

A first cam groove (not illustrated) and a second cam groove (not illustrated) are formed in the cam tube 41D. The first cam groove is a cam groove for moving the lens group Z1. The second cam groove is a cam groove for moving the lens Z2. A first cam pin (not illustrated) is provided at a lens holding frame of the lens group Z1. A second cam pin (not illustrated) is provided at a lens holding frame of the lens Z2. The first cam pin is inserted into the first cam groove, and the second cam pin is inserted into the second cam groove.

When the cam tube 41D rotates around the first optical axis A1, the lens group Z1 moves along the first cam groove and the first optical axis A1, and the lens Z2 moves along the second cam groove and the first optical axis A1. In this way, when the lens group Z1 and the lens Z2 move along the first optical axis A1, the position of the lens group Z1 on the first optical axis changes, the position of the lens Z2 on the first optical axis A1 changes, and the interval between the lens group Z1 and the lens Z2 changes. Therefore, zooming is performed.

The cam tube 41D rotates as a result of driving of the zoom motor 51. A cylindrical gear 58 is provided on an outer side of the inner tube 41A. The gear 58 rotates around the inner tube 41A due to the driving of the zoom motor 51. A drive pin (not illustrated) for rotating the cam tube 41D is provided at the gear 58. When the gear 58 rotates, the drive pin also rotates in a peripheral direction of the inner tube 41A, and the rotation causes the cam tube 41D to rotate. An insertion groove (not illustrated) in which the drive pin is inserted is formed in the peripheral direction in the inner tube 41A to prevent interference with the drive pin.

A fixed aperture stop St is provided between the lens Z11 and the lens Z12 in an inner portion of the zoom-lens lens barrel 41C. The fixed aperture stop St narrows a light beam that is incident thereupon from the main body portion 12. By providing the fixed aperture stop St in the zoom-lens lens barrel 41C, it is possible to realize a telecentric optical system in which the size of an image in the center of an image formation surface and the size of the image in the vicinity do not differ regardless of an incidence height of the light beam.

The focus adjustment tube 41E is mounted on the incidence-side end portion of the inner tube 41A, and is rotatable around the first optical axis A1 with respect to the inner tube 41A. Threaded grooves are formed in an outer peripheral surface of an exit-side end portion of the focus adjustment tube 41E and in an inner peripheral surface of the inner tube 41A, and the threaded grooves mesh with each other. Since the inner tube 41A is fixed with respect to the main body portion 12, when the focus adjustment tube 41E rotates with respect to the inner tube 41A, the focus adjustment tube 41E moves along the first optical axis A1 by the action of the threads.

The focus adjustment tube 41E holds the focus adjustment lens FA. By moving the lens FA along the first optical axis A1, a focus position of the entire system of the projection lens 11 and the position of the image formation panel 32 relative to each other are adjusted. When mounting the projection lens 11 onto the main body portion 12, there is an individual difference in the mounting position of the projection lens 11 with respect to the image formation panel 32. The focus adjustment tube 41E is provided for making substantially the same the focus position of the entire system of the projection lens 11 and the position of the image formation panel 32 relative to each other by absorbing such an individual difference occurring at the time of manufacture.

A first rotation-position detection sensor 59 is provided at an outer peripheral surface of the outer tube 41B. The first rotation-position detection sensor 59 detects the rotation position of the outer tube 41B with respect to the inner tube 41A.

The first mirror holding portion 44 is mounted on an exit-side end portion of the outer tube 41B. Therefore, the rotation of the outer tube 41B around the first optical axis A1 with respect to the inner tube 41A causes the first mirror holding portion 44 to rotate around the first optical axis A1. The first mirror holding portion 44 holds the first mirror 48 with a reflective surface of the first mirror 48 being oriented at an angle of 45° with respect to each of the first optical axis A1 and the second optical axis A2. The first mirror 48 is a specular reflective type mirror in which a transparent member, such as glass, is coated with a reflective film.

The second lens barrel portion 42 includes an outer tube 42A and the inner tube 42B. An incidence-side end portion of the outer tube 42A is mounted on the first mirror holding portion 44. The inner tube 42B is mounted so as to be rotatable around the second optical axis A2 with respect to the outer tube 42A.

The second lens barrel portion 42 holds a second optical system L2. The second optical system L2 is constituted by, for example, a lens L21 and a lens L22, and is disposed on the second optical axis A2. The outer tube 42A holds the lens L21. The inner tube 42B holds the lens L22.

In the present example, the second optical system L2 functions as a relay lens. More specifically, the first optical system L1 of the first lens barrel portion 41 forms an intermediate image in the first mirror holding portion 44. The second optical system L2 relays, with the intermediate image being a subject, a light beam that represents the intermediate image to the second mirror holding portion 46 and the third lens barrel portion 43.

In the second lens barrel portion 42, the second mirror holding portion 46 is mounted on an exit-side end portion of the inner tube 42B. Therefore, rotation of the inner tube 42B around the second optical axis A2 with respect to the outer tube 42A causes the second mirror holding portion 46 to rotate around the second optical axis A2.

A second rotation-position detection sensor 60 is provided at an outer peripheral surface of the outer tube 42A. The second rotation-position detection sensor 60 detects the rotation position of the inner tube 42B with respect to the outer tube 42A.

The second mirror holding portion 46 holds the second mirror 49 with a reflective surface of the second mirror 49 being oriented at an angle of 45° with respect to each of the second optical axis A2 and the third optical axis A3. Similarly to the first mirror 48, the second mirror 49 is a specular reflective type mirror.

An exit-side end portion 46A of the second mirror holding portion 46 constitutes the third lens barrel portion 43. In addition to the end portion 46A, the third lens barrel portion 43 includes a fixed tube 43A, an exit-lens holding frame 43B, and a focus-lens lens barrel 43C.

The third lens barrel portion 43 holds a third optical system L3. The third optical system L3 is constituted by, for example, a lens L31, a lens L32, and the exit lens 16, and is disposed on the third optical axis A3. The end portion 46A is a cylindrical portion whose center axis substantially coincides with the third optical axis A3, and functions as a lens holding frame that holds the lens L31.

The fixed tube 43A is mounted on an exit-side of the end portion 46A. The exit-lens holding frame 43B is mounted on an exit-side end portion of the fixed tube 43A. The fixed tube 43A holds, on an inner peripheral side, the focus-lens lens barrel 43C so as to be movable in a direction of the third optical axis A3. The focus-lens lens barrel 43C holds the focus lens L32.

A gear 62 is provided at an outer periphery of the fixed tube 43A. The gear 62 rotates in a peripheral direction of the fixed tube 43A due to driving of the focus motor 52. A threaded groove is formed in an inner peripheral surface of the gear 62. A threaded groove is also formed in the outer peripheral surface of the fixed tube 43A. The threaded groove in the inner peripheral surface of the gear 62 and the threaded groove in the outer peripheral surface of the fixed tube 43A mesh with each other. Therefore, when the gear 62 rotates, the gear 62 moves in the direction of the third optical axis A3 with respect to the fixed tube 43A. A drive pin 62A is provided at the gear 62, and is inserted into the focus-lens lens barrel 43C. Therefore, the movement of the gear 62 causes the focus-lens lens barrel 43C to also move along the third optical axis A3. By the movement of the focus-lens lens barrel 43C, as a focus position of the projection lens 11, a focus position that is in accordance with the distance between the screen 36 and the projection lens 11 is adjusted.

Here, in the present example, the third optical axis A3 is an example of an exit-side optical axis along which the light incident upon the projection lens 11 from the main body portion 12 exits, the second optical axis A2 is an example of a first incidence-side optical axis that is disposed on an incidence side with respect to the third optical axis A3 and that is bent with respect to the third optical axis A3, and the first optical axis A1 is an example of a second incidence-side optical axis that is disposed on an incidence side with respect to the second optical axis A2 and that is bent with respect to the second optical axis A2.

The third lens barrel portion 43 is an example of an exit-side lens barrel portion through which the exit-side optical axis extends. The second lens barrel portion 42 is an example of a first incidence-side lens barrel portion that is disposed on an incidence side with respect to the exit-side lens barrel portion and through which the first incidence-side optical axis extends. The first lens barrel portion 41 is an example of a second incidence-side lens barrel portion that is disposed on an incidence side with respect to the first incidence-side lens barrel portion and through which the second incidence-side optical axis extends.

In the second lens barrel portion 42, the inner tube 42B is an example of a first rotary tube that rotates around the first incidence-side optical axis (the second optical axis A2) as a result of rotating the third lens barrel portion 43. The outer tube 42A is an example of a first fixed tube on which the first rotary tube is mounted. In the first lens barrel portion 41, the outer tube 41B is an example of a second rotary tube that rotates around the second incidence-side optical axis (the first optical axis A1), and the inner tube 41A is an example of a second fixed tube.

Figure 9:
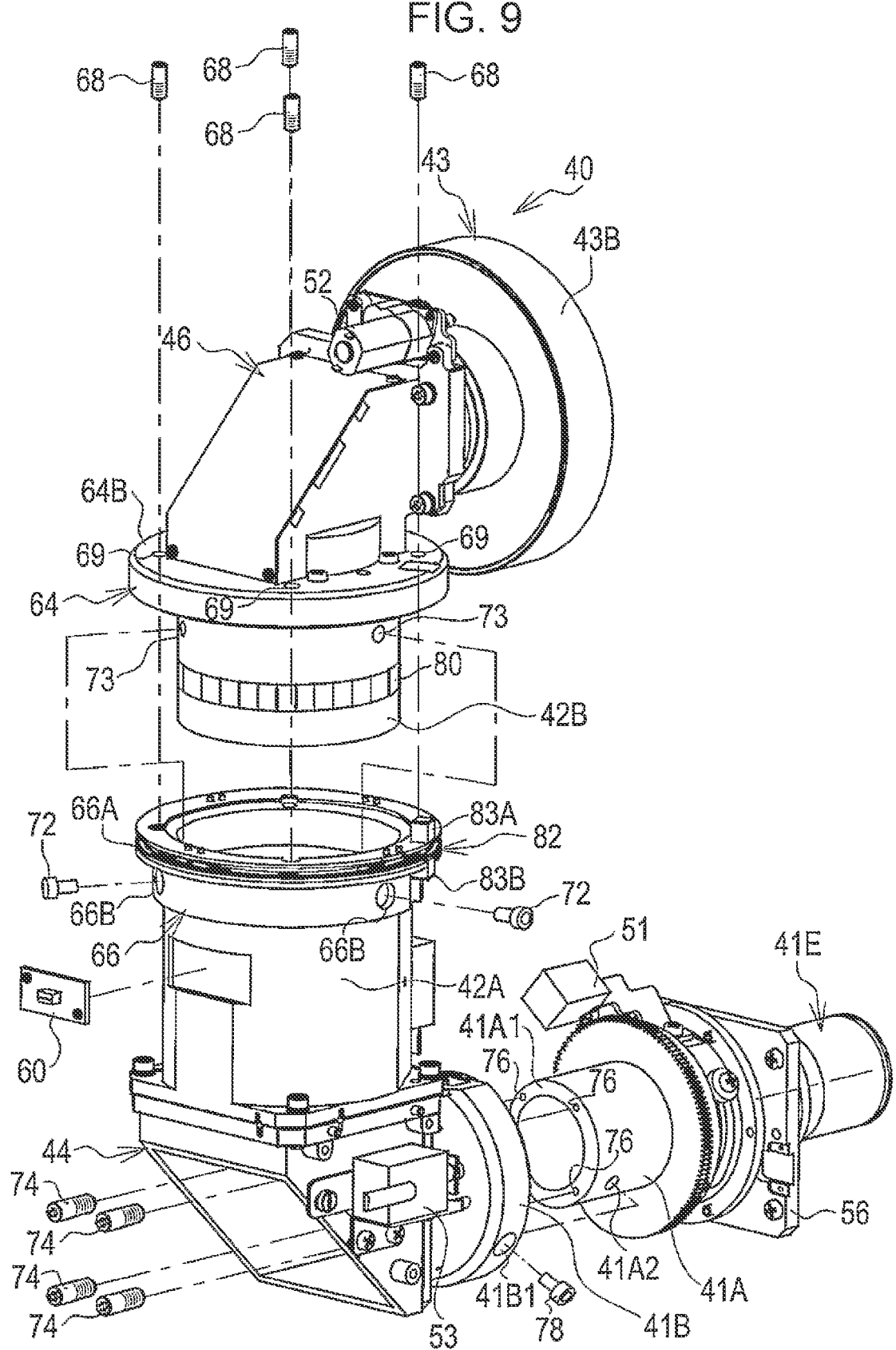
FIG. 9 is an exploded perspective view of the projection lens.

As illustrated in FIGS. 7 to 9, a rotary portion 64 that is connected to one end of the inner tube 42B of the second lens barrel portion 42 is provided at an incidence-side end portion of the second mirror holding portion 46. By connecting the inner tube 42B and the rotary portion 64 to each other, rotation of the third lens barrel portion 43 and the second mirror holding portion 46 around the second optical axis A2 causes the inner tube 42B to rotate. The rotary portion 64 has a flange shape whose diameter is larger than the diameter of the inner tube 42B and that extends in a radial direction with respect to the inner tube 42B.

At an exit-side end portion of the outer tube 42A, a wide-width portion 66 whose diameter is larger than the diameter of the incidence-side end portion thereof is provided. As illustrated in FIG. 6, an incidence-side surface 64A of the rotary portion 64 and an exit-side end surface 66A of the wide-width portion 66 are disposed so as to face each other in a direction of the second optical axis A2.

Four ball plungers 68 are provided at an exit-side surface 64B of the rotary portion 64. As described below, each ball plunger 68 is an example of a first pressing portion that presses the outer tube 42A, which is a first fixed tube, in the direction of the second optical axis A2. The second mirror holding portion 46 is an example of a first connection frame that connects the third lens barrel portion 43 and the second lens barrel portion 42 to each other. Each ball plunger 68, which is an example of a first pressing portion, is mounted on the surface 64B of the rotary portion 64, which is an example of an outer peripheral surface of the first connection frame.

Mounting holes 69 for mounting the ball plungers 68 are formed in the surface 64B of the rotary portion 64. Four mounting holes 69 are formed in correspondence with the number of ball plungers 68. Outer peripheral surfaces around the axes of the ball plungers 68 are threaded. By engaging the threads with the mounting holes 69, the ball plungers 68 are fixed to the rotary portion 64 by the action of the threads. The mounting positions of the ball plungers 68 in the direction of the second optical axis A2 can be adjusted by the action of the threads.

As one example, the four mounting holes 69 are disposed at an interval of 90° in a peripheral direction around the second optical axis A2. By mounting the four ball plungers 68 in the respective mounting holes 69, the four ball plungers 68 are disposed apart from each other at an interval of 90° in the peripheral direction around the second optical axis A2.

The surface 66A of the wide-width portion 66 (also refer to FIGS. 10 and 11) is disposed so as to face the ball plungers 68 in the direction of the second optical axis A2. The surface 66A of the wide-width portion 66 is an example of a first press surface that is pressed by the ball plungers 68. The ball plungers 68 are rotated by rotation of the third lens barrel portion 43 around the second optical axis A2. The surface 66A of the wide-width portion 66 is pressed by the ball plungers 68 regardless of the rotation position of the third lens barrel portion 43.

Figure 10:
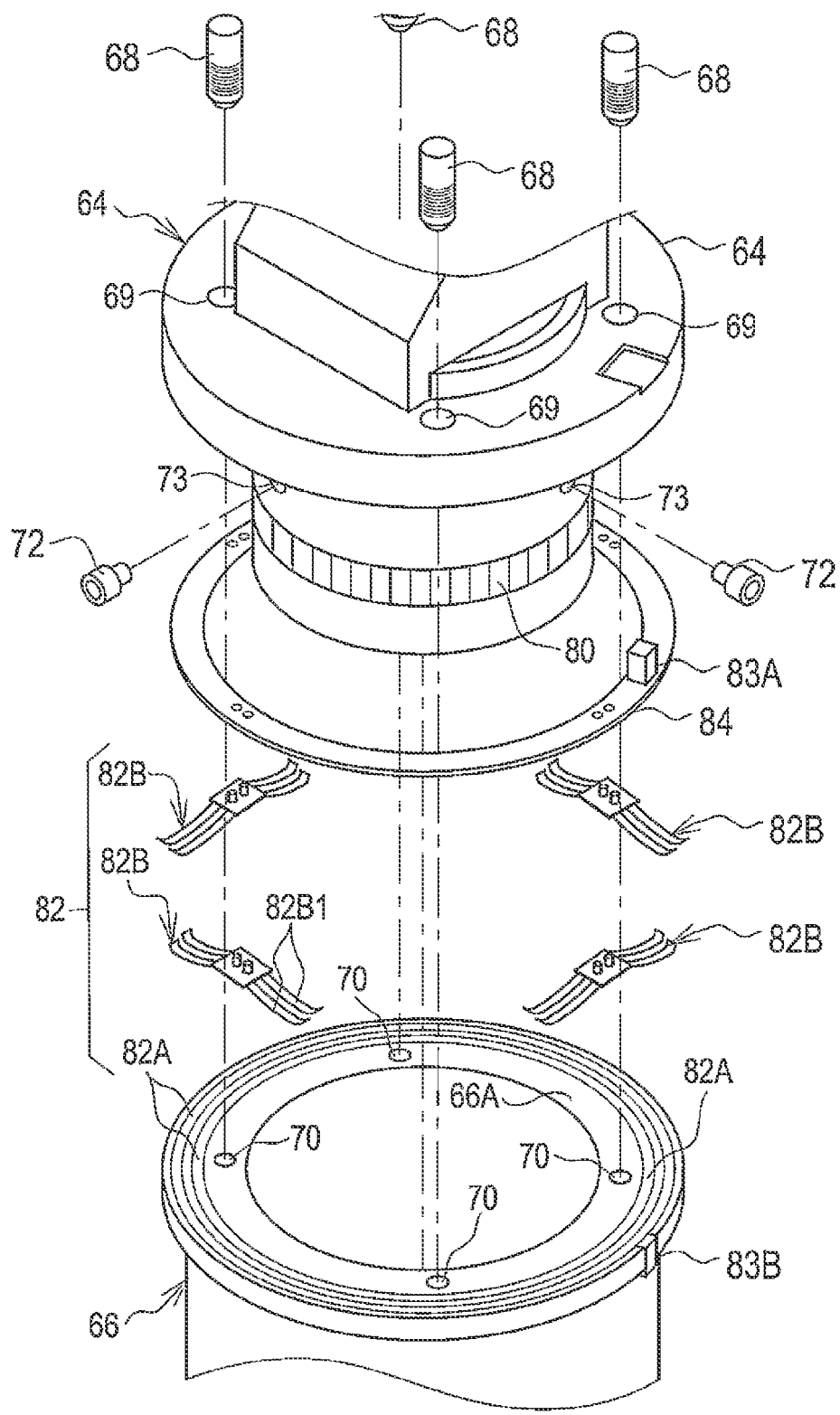
FIG. 10 is an explanatory view of first pressing portions and a first conduction portion.

As illustrated in FIG. 10, four fitting holes 70 to which end portions of the four ball plungers 68 corresponding thereto are fitted are formed in the surface 66A. Each fitting hole 70 is an example of a first fitting hole. The four fitting holes 70 are disposed apart from each other at an interval of 90° in the peripheral direction around the second optical axis A2 in correspondence with the four ball plungers 68.

Figure 11A:
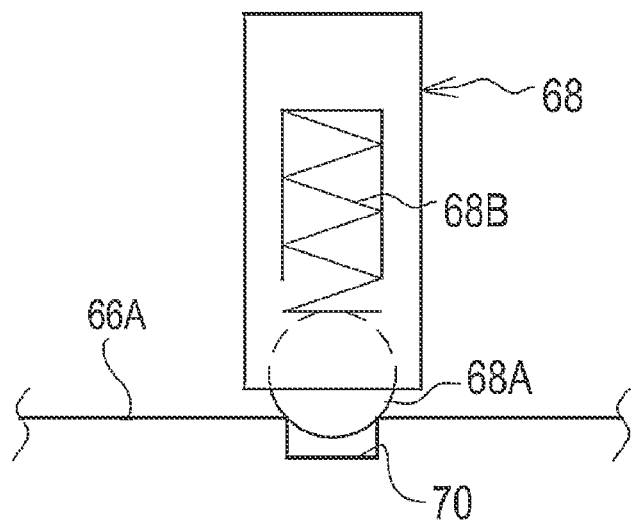
FIGS. 11A and 11B are each an explanatory view of a ball plunger, with FIG. 11A illustrating a fitting state and FIG. 11B illustrating a move-out state.
Figure 11B:
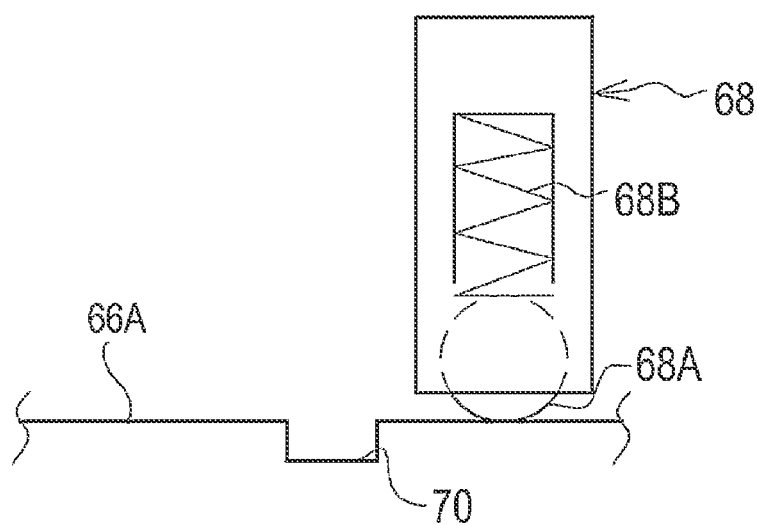

As illustrated in FIGS. 11A and 11B, as is well known, each ball plunger 68 has a spring 68B that is provided in an inner portion of a main body and a ball 68A that is provided at one end portion of the main body. Each ball 68A is pressed by a pressing force of the spring 68B in a direction in which the ball 68A protrudes from the one end portion of the main body. When the third lens barrel portion 43 rotates around the second optical axis A2, the state of each ball plunger 68 is switched between a fitting state illustrated in FIG. 11A in which each ball plunger 68 is fitted to the fitting hole 70 and a move-out state illustrated in FIG. 11B in which each ball plunger 68 moves out of the fitting hole 70.

In FIG. 10, mounting holes 73 for mounting ball bearings 72 are formed in an outer peripheral surface of the inner tube 42B (refer to, for example, FIG. 9). Each ball bearing 72 is an example of a first protrusion portion that protrudes in a radial direction of the inner tube 42B. As described below, each ball bearing 72 constitutes a first engaging portion that rotatably engages the inner tube 42B with respect to the outer tube 42A (refer to, for example, FIG. 9). Each ball bearing 72 has a shaft portion and a head portion, and is a ball bearing with a shaft and whose head portion functions as a ball bearing. By fitting the shaft portion of each ball bearing 72 to its corresponding mounting hole 73, each ball bearing 72 is fixed to the inner tube 42B. With each ball bearing 72 being fixed to the inner tube 42B, each ball bearing 72 protrudes in the radial direction of the inner tube 42B.

Three ball bearings 72 are provided. The three ball bearings 72 are disposed apart from each other at an interval of 120° in the peripheral direction around the second optical axis A2 in the inner tube 42B (also refer to FIG. 14). Insertion holes 66B in which the three ball bearings 72 can be inserted are formed in an outer peripheral surface in the peripheral direction around the second optical axis A2 in the wide-width portion 66. The insertion holes 66B are provided for allowing the ball bearings 72 to enter an inner portion of the outer tube 42A from the outside of the outer tube 42A with the inner tube 42B being inserted in the outer tube 42A.

Figure 12:
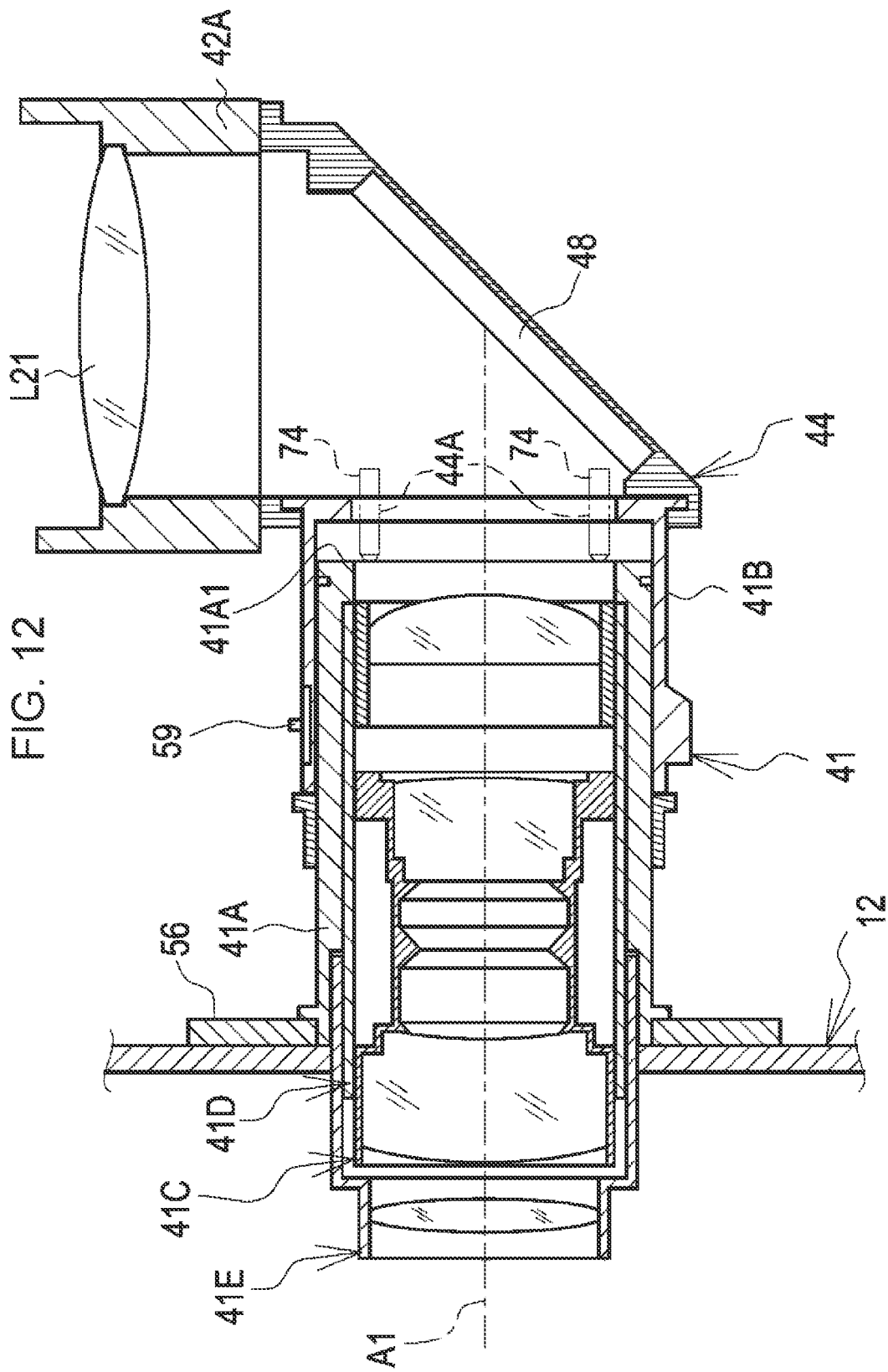
FIG. 12 is an explanatory view of second pressing portions.

As illustrated in FIG. 12 in addition to FIG. 9, four ball plungers 74 are also provided in the outer tube 41B, which is a second rotary tube, of the first lens barrel portion 41. As described below, each ball plunger 74 is an example of a second pressing portion that presses the inner tube 41A, which is a second fixed tube, in a direction of the first optical axis A1. The first mirror holding portion 44 is an example of a second connection frame that connects the second lens barrel portion 42 and the first lens barrel portion 41 to each other. The ball plungers 74 are mounted at the first mirror holding portion 44, and are disposed in an inner portion of the first mirror holding portion 44. The first mirror holding portion 44 is an example of a pressing-portion holding member that holds the second pressing portions. The first mirror holding portion 44 can be separated from the outer tube 41B.

Similarly to the mounting holes 69, mounting holes 44A for mounting the ball plungers 74 are formed in the first mirror holding portion 44. Four mounting holes 44A are formed in correspondence with the number of ball plungers 74. Similarly to the ball plungers 68, outer peripheral surfaces around the axes of the ball plungers 74 are threaded. By engaging the threads with the mounting holes 44A, the ball plungers 74 are fixed to the first mirror holding portion 44 by the action of the threads. The mounting positions of the ball plungers 74 in the direction of the first optical axis A1 can be adjusted by the action of the threads.

As one example, similarly to the mounting holes 69 for the ball plungers 68, the four mounting holes 44A are disposed at an interval of 90° in a peripheral direction around the first optical axis A1. By mounting the four ball plungers 74 in the respective mounting holes 44A, the four ball plungers 74 are disposed apart from each other at an interval of 90° in the peripheral direction around the first optical axis A1.

An exit-side end surface 41A1 of the inner tube 41A is disposed so as to face the ball plungers 74 in the direction of the first optical axis A1. The end surface 41A1 is an example of a second press surface that is pressed by the ball plungers 74. The ball plungers 74 rotate as a result of rotating the second lens barrel portion 42 around the first optical axis A1. The end surface 41A1 of the inner tube 41A is pressed by the ball plungers 74 regardless of the rotation position of the second lens barrel portion 42.

Four fitting holes 76 (refer to FIG. 9) to which end portions of the four ball plungers 74 corresponding thereto are fitted are formed in the end surface 41A1 of the inner tube 41A. Each fitting hole 76 is an example of a second fitting hole. The four fitting holes 76 are disposed apart from each other at an interval of 90° in the peripheral direction around the first optical axis A1 in correspondence with the four ball plungers 74.

When the second lens barrel portion 42 rotates around the first optical axis A1, a state of the four ball plungers 74 is switched between a fitting state in which the ball plungers 74 are fitted to the fitting holes 76 and a move-out state in which the ball plungers 74 move out of the fitting holes 76. Such operations of the ball plungers 74 are similar to those of the ball plungers 68 illustrated in FIGS. 11A and 11B.

As illustrated in FIG. 9, mounting holes 41A2 for mounting ball bearings 78 similar to the ball bearings 72 are formed in the outer peripheral surface of the inner tube 41A. Each ball bearing 78 is an example of a second protrusion portion that protrudes from the inner tube 41A. As described below, each ball bearing that functions as a second protrusion portion constitutes a second engaging portion that rotatably engages the outer tube 41B with respect to the inner tube 41A.

Similarly to the ball bearings 72, three ball bearings 78 are provided. The three ball bearings 78 are disposed apart from each other at an interval of 120° in the peripheral direction around the first optical axis A1 in the inner tube 41A. Insertion holes 41B1 in which the three ball bearings 78 can be inserted are formed in an outer periphery in the peripheral direction around the second optical axis A2 in the outer tube 41B. The insertion holes 41B1 are provided for allowing the ball bearings 78 to enter an inner portion of the outer tube 41B from the outside of the outer tube 41B with the inner tube 41A being inserted in the outer tube 41B.

A pattern formation portion 80 (refer to FIGS. 9 and 10) is provided on a portion of the outer peripheral surface of the inner tube 42B that faces an inner peripheral surface of the outer tube 42A with the inner tube 42B being mounted on the outer tube 42A. As described below, the pattern formation portion 80 and the second rotation-position detection sensor 60 constitute a second rotation-position detection mechanism.

As illustrated in FIG. 10, a first conduction portion 82 is provided between the end surface 66A of the wide-width portion 66 of the outer tube 42A and the surface 64A of the rotary portion 64. The first conduction portion 82 performs electrical conduction between a side of the outer tube 42A and a side of the inner tube 42B. For example, in the direction of the optical axis, the focus motor 52 is provided at the outer peripheral surface of the second mirror holding portion 46 on the side of the inner tube 42B. On the other hand, on the side of the outer tube 42A, for example, a power supply that supplies electrical power and a control board that sends a control signal to the focus motor 52 are provided in the main body portion 12. The first conduction portion 82 is used for sending electrical power from the power supply and a control signal from the control board to the focus motor 52. The first conduction portion 82 is constituted by a cableless-type conduction portion.

Figure 13:
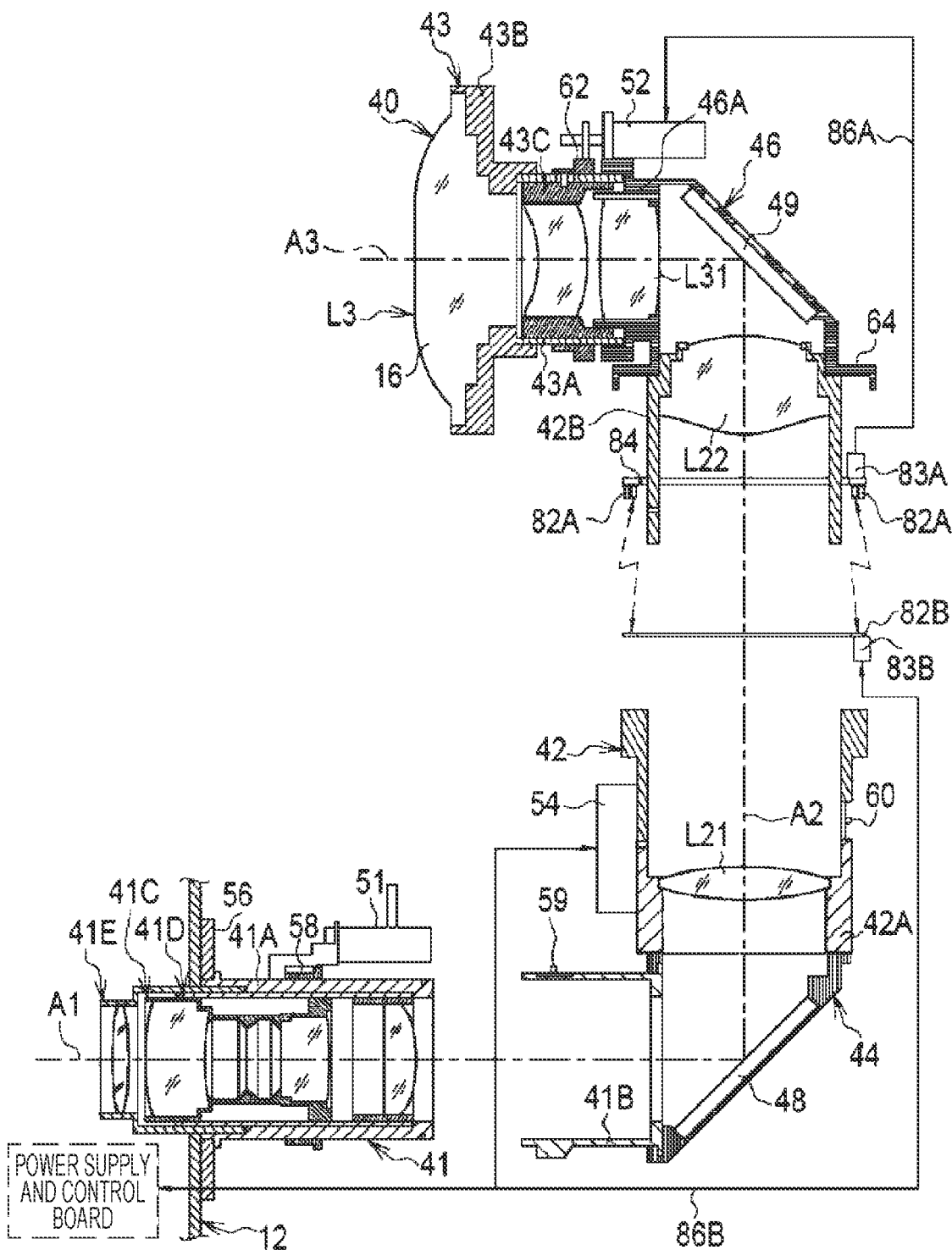
FIG. 13 is an explanatory view of the first conduction portion and a second conduction portion.

As illustrated in FIG. 13, a connector 83A is, for example, electrically connected to the first conduction portion 82 via a metal strip (not illustrated) or the like. The connector 83A rotates as a result of rotating the inner tube 42B around the second optical axis A2. The connector 83A is electrically connected to the focus motor 52 via a cable 86A.

As illustrated in FIG. 10, at the rotary portion 64 of the second mirror holding portion 46 and the wide-width portion 66 of the outer tube 42A, rotary electrodes 82B and fixed electrodes 82A are disposed on an outer side with respect to the ball plungers 68. As a result, since it is possible to extend the cable 86A from an outer side of the rotary portion 64, interference with other members is reduced, and the focus motor 52 and the cable 86A can be easily electrically connected to each other.

A connector 83B is provided at the outer tube 42A (also refer to FIG. 9). The connector 83B is, for example, electrically connected to the first conduction portion 82 via a metal strip (not illustrated) or the like. The connector 83B is electrically connected to the power supply and the control board of the main body portion 12 via a cable 86B.

In FIG. 10, the first conduction portion 82 is constituted by one set of electrodes including the fixed electrodes 82A that are provided at the outer tube 42A and the rotary electrodes 82B that are provided at the inner tube 42B. The rotary electrodes 82B are mounted on the rotary portion 64 connected to the inner tube 42B, and are indirectly provided with respect to the inner tube 42B. Therefore, the rotary electrodes 82B rotate as a result of rotating the inner tube 42B. The fixed electrodes 82A are mounted on the surface 66A of the wide-width portion 66 of the outer tube 42A, and are directly provided with respect to the outer tube 42A. Since the outer tube 42A does not rotate around the second optical axis A2, the fixed electrodes 82A also do not rotate around the second optical axis A2.

The fixed electrodes 82A are planar electrodes that extend in the peripheral direction around the second optical axis A2. More specifically, the planar electrodes are ring-shaped electrodes. The rotary electrodes 82B are partial contact electrodes that partially contact the fixed electrodes 82A. Four rotary electrodes 82B are provided, and are disposed apart from each other in a peripheral direction of the ring-shaped fixed electrodes 82A.

The four rotary electrodes 82B are mounted on a ring-shaped mount plate 84. The mount plate 84 is mounted on the rotary portion 64. Therefore, the four rotary electrodes 82B are indirectly provided at the inner tube 42B, and rotate as a result of rotating the inner tube 42B. The connector 83A is also mounted on the mount plate 84. The fixed electrodes 82A and the rotary electrodes 82B while being kept in a contact state rotate relative to each other. That is, the fixed electrodes 82A and the rotary electrodes 82B normally in contact with each other rotate relative to each other.

In a radial direction of the outer tube 42A and the inner tube 42B, the first conduction portion 82 is disposed on an outer side with respect to the ball plungers 68.

Figure 14:
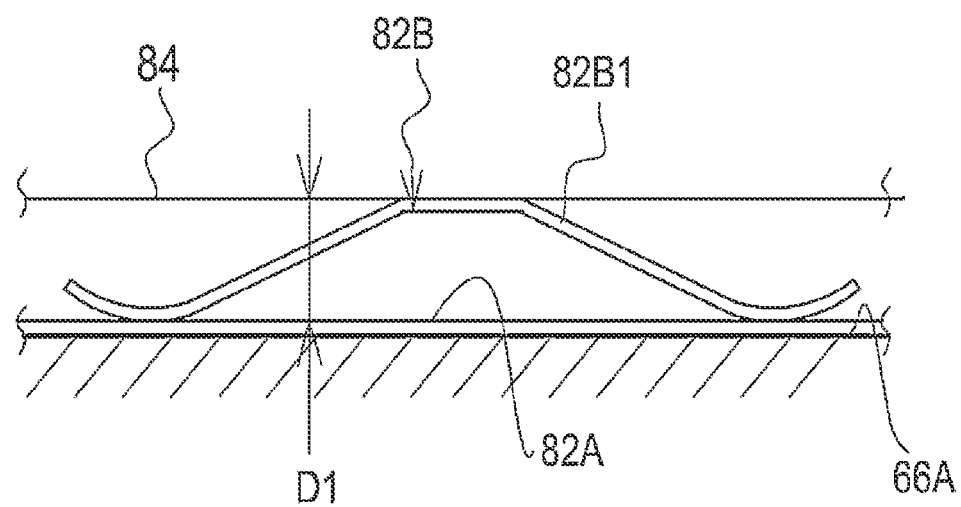
FIG. 14 is an explanatory view of a fixed electrode and a rotary electrode.

As illustrated in FIG. 14 in addition to FIG. 10, each rotary electrode 82B is formed from a conductive strip 82B1 that is elastic. Each strip 82B1 has the shape of a belt. At an intermediate portion in a longitudinal direction, both ends of each strip 82B1 are bent in a direction of the fixed electrodes 82A. Both of the ends of the strips 82B1 in the longitudinal direction contact the fixed electrodes 82A.

A distance D1 between the mount plate 84 on which the strips 82B1 are mounted and the fixed electrodes 82A is narrower than a thickness at which external force is not applied to the strips 82B1. Therefore, the strips 82B1, in an elastically deformed state, are in contact with the fixed electrodes 82A. Due to the action of elastic forces, both of the ends of the strips 82B1 are pressed toward the fixed electrodes 82A. Therefore, the rotary electrodes 82B press-contact the fixed electrodes 82A.

As illustrated in FIG. 10, each rotary electrode 82B has a set of two strips 82B1 to which electrical signals that differ from each other are input. Two fixed electrodes 82A are also provided, and the two fixed electrodes 82A contact the strips 82B1. These are used as electrodes for supplying electrical power and for sending control signals.

As illustrated in FIG. 13, in the second lens barrel portion 42, the first conduction portion 82 for performs electrical conduction between the side of the inner tube 42B, which is a first rotary tube, and the side of the outer tube 42A, which is a first fixed tube, is a cableless-type conduction portion. In contrast, in the first lens barrel portion 41, a second conduction portion for performing electrical conduction between a side of the outer tube 41B, which is a second rotary tube, and a side of the inner tube 41A, which is a second fixed tube, is a cable-type conduction portion that uses the cable 86B.

Figure 15:
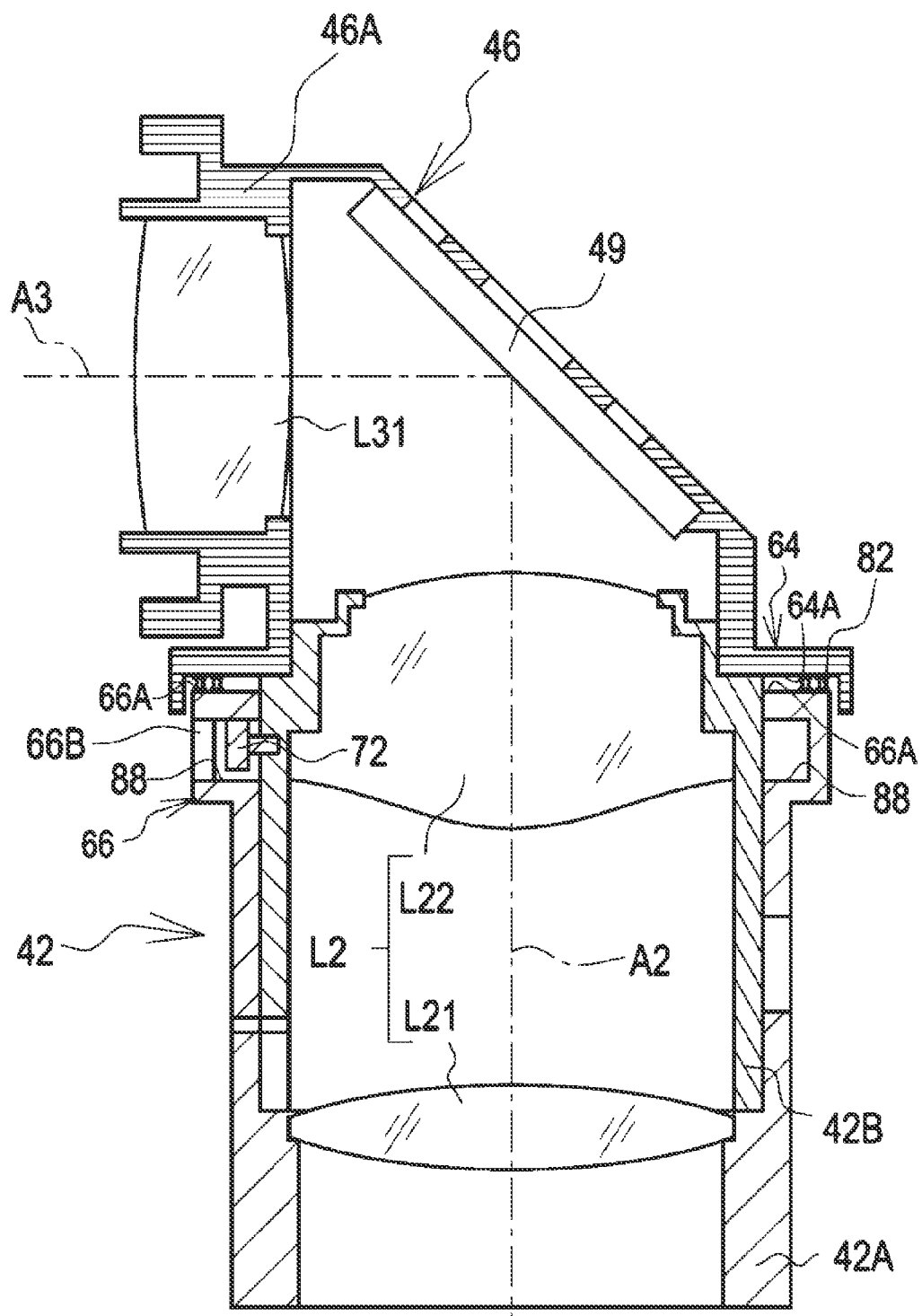
FIG. 15 is a vertical sectional view of a second lens barrel portion.
Figure 16A:
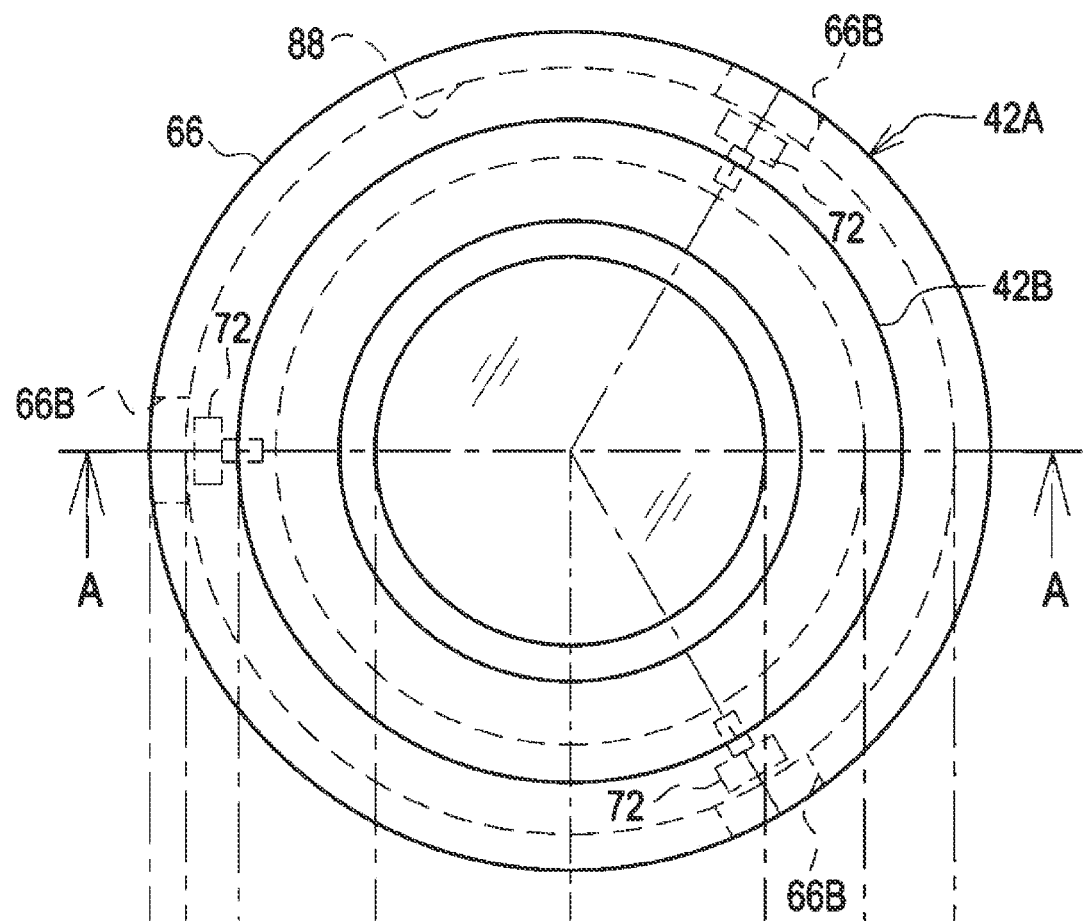
FIGS. 16A and 16B are each an explanatory view of first engaging portions, with FIG. 16A being a plan view of the first engaging portions and FIG. 16B being a sectional view of the first engaging portions.

As illustrated in FIGS. 15 and 17, in the second lens barrel portion 42, an accommodation groove 88 is formed in the inner peripheral surface of the outer tube 42A. As illustrated in FIG. 16A, in the inner peripheral surface of the outer tube 42A, the accommodation groove 88 is formed in the entire circumference in the peripheral direction around the second optical axis A2. The accommodation groove 88 can accommodate at least a part of each ball bearing 72. The inner tube 42B rotates with respect to the outer tube 42A with the ball bearings 72 protruding from the inner tube 42B being accommodated in the accommodation groove 88.

Figure 16B:
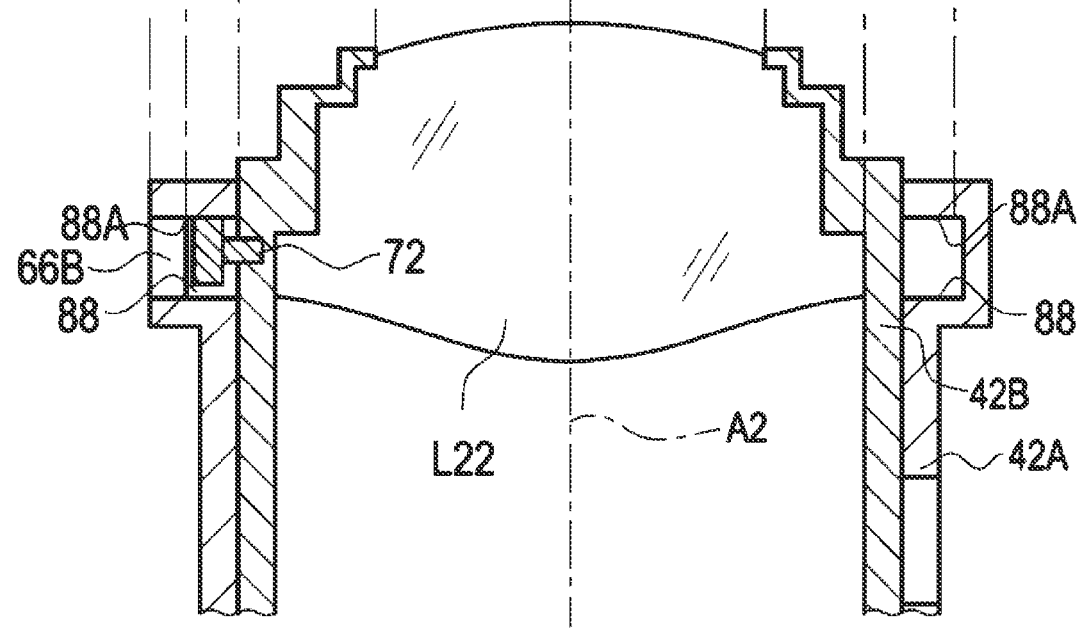

As illustrated in FIG. 16B, an abutment surface 88A that abuts upon the ball bearings 72 is formed at one surface on an exit side in the direction of the second optical axis A2 in the accommodation groove 88. The ball bearings 72 and the abutment surface 88A are disposed so as to face each other in the direction of the second optical axis A2. The abutment surface 88A is an example of a first abutment surface. The ball bearings 72 and the abutment surface 88A constitute the first engaging portions.

Figure 17A:
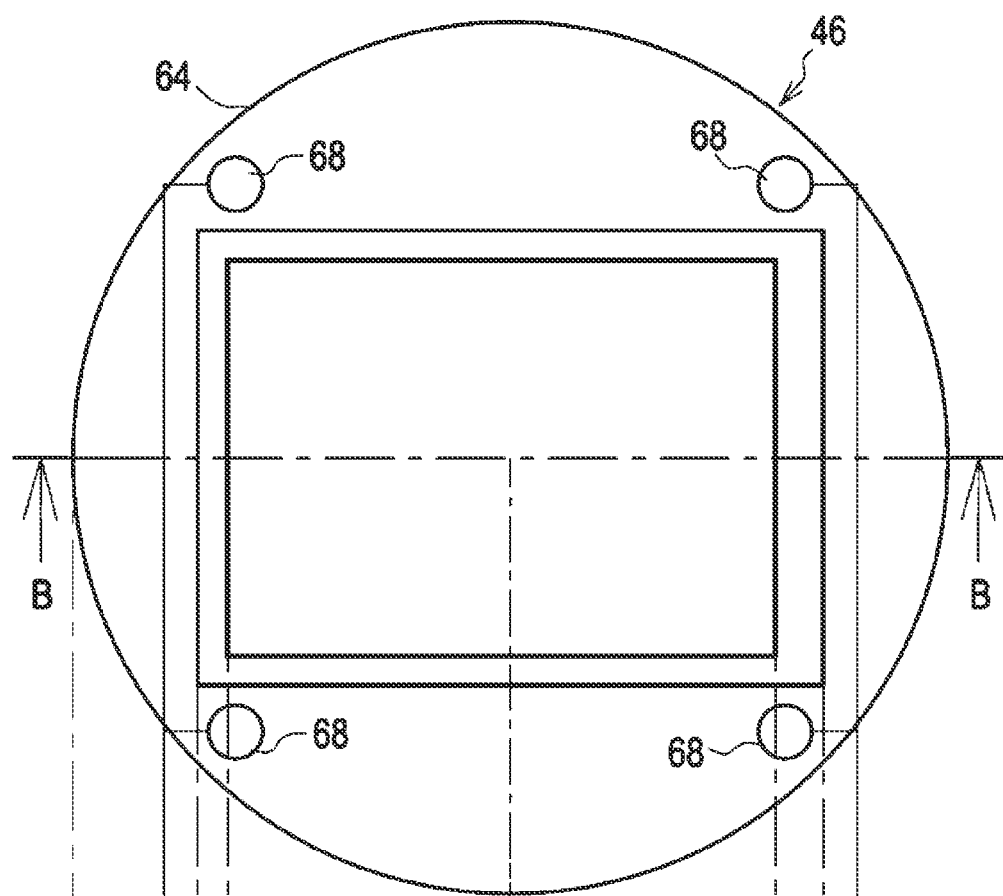
FIGS. 17A and 17B are explanatory views illustrating the relationship between the first engaging portions and the first pressing portions, with FIG. 17A being a plan view illustrating the first pressing portions, and FIG. 17B being a sectional view of the first engaging portions.
Figure 17B:
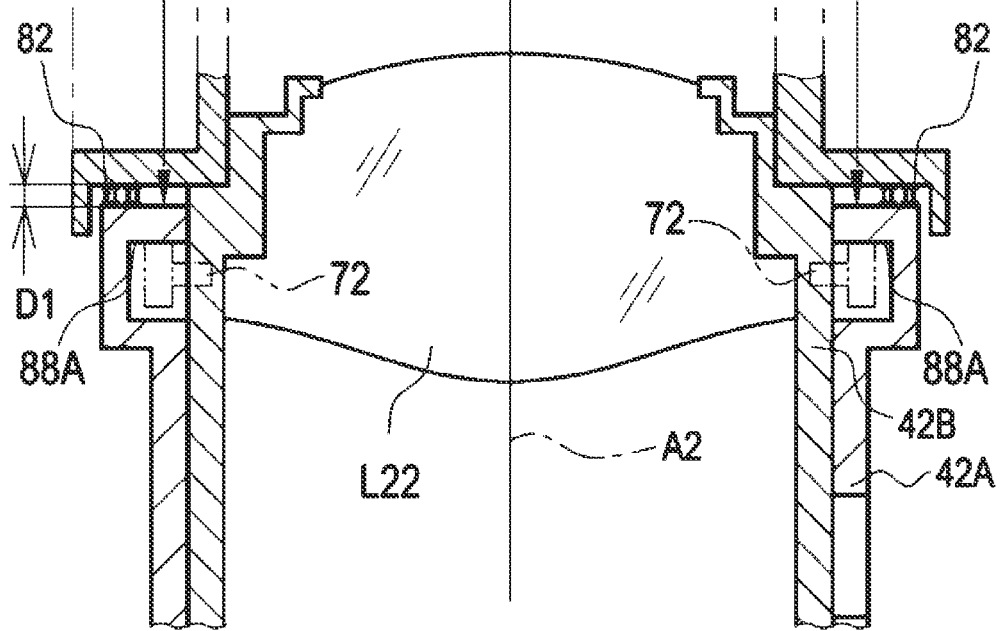

Of FIGS. 17A and 17B, as illustrated in FIG. 17A, the ball plungers 68 are provided at the rotary portion 64. As illustrated in FIG. 17B, the ball plungers 68 press the surface 66A of the outer tube 42A in the direction of the second optical axis A2. By the pressing, the ball bearings 72 that are provided at the inner tube 42B are pressed against the abutment surface 88A that is formed at the accommodation groove 88 of the outer tube 42A. By pressing the ball bearings 72 against the abutment surface 88A, backlash between the ball bearings 72 and the accommodation groove 88 is suppressed.

FIG. 18 is a schematic view clearly illustrating the functions of the ball bearings 72 and the ball plungers 68 by ignoring the actual relative positions between the plurality of ball bearings 72 and the plurality of ball plungers 68.

As illustrated in FIG. 18, each ball plunger 68 has a top portion 68C. Each top portion 68C is a portion that is farthest from the end surface 66A in an outer peripheral portion of its corresponding ball plunger 68. An interval D2 between the rotary portion 64, at which the ball plungers 68 are mounted, and the ball bearings 72 is fixed. The mounting positions of the ball plungers 68 with respect to the rotary portion 64 can be adjusted by the action of the threads of the ball plungers 68. Therefore, the larger the amount of insertion of the ball plungers 68 is with respect to the rotary portion 64, the narrower an interval D3 between the top portions 68C of the ball plungers 68 and the ball bearings 72 is, whereas the smaller the amount of insertion is, the wider the interval D3 is.

The narrower the interval D3 is, the stronger the pressing force of the ball bearings 72 is with respect to the abutment surface 88A. The stronger the pressing force is, the more the backlash of the inner tube 42B is suppressed with respect to the outer tube 42A.

The stronger the pressing force is, the larger the friction force between the ball bearings 72 and the abutment surface 88A and the friction force between the ball plungers 68 and the surface 66A are. Due to these friction forces, a rotation restriction force that restricts rotation of the inner tube 42B, that is, a rotation restriction force that restricts rotation of the exit-side end portion 14C around the second optical axis A2 is generated. When the rotation restriction force is large, an operation force for rotating the exit-side end portion 14C is also large. In contrast, when the rotation restriction force is small, the exit-side end portion 14C may rotate accidentally. Considering such circumstances, a rotation restriction force that is generated based on the pressing force of the ball plungers 68 is set.

Figure 19:
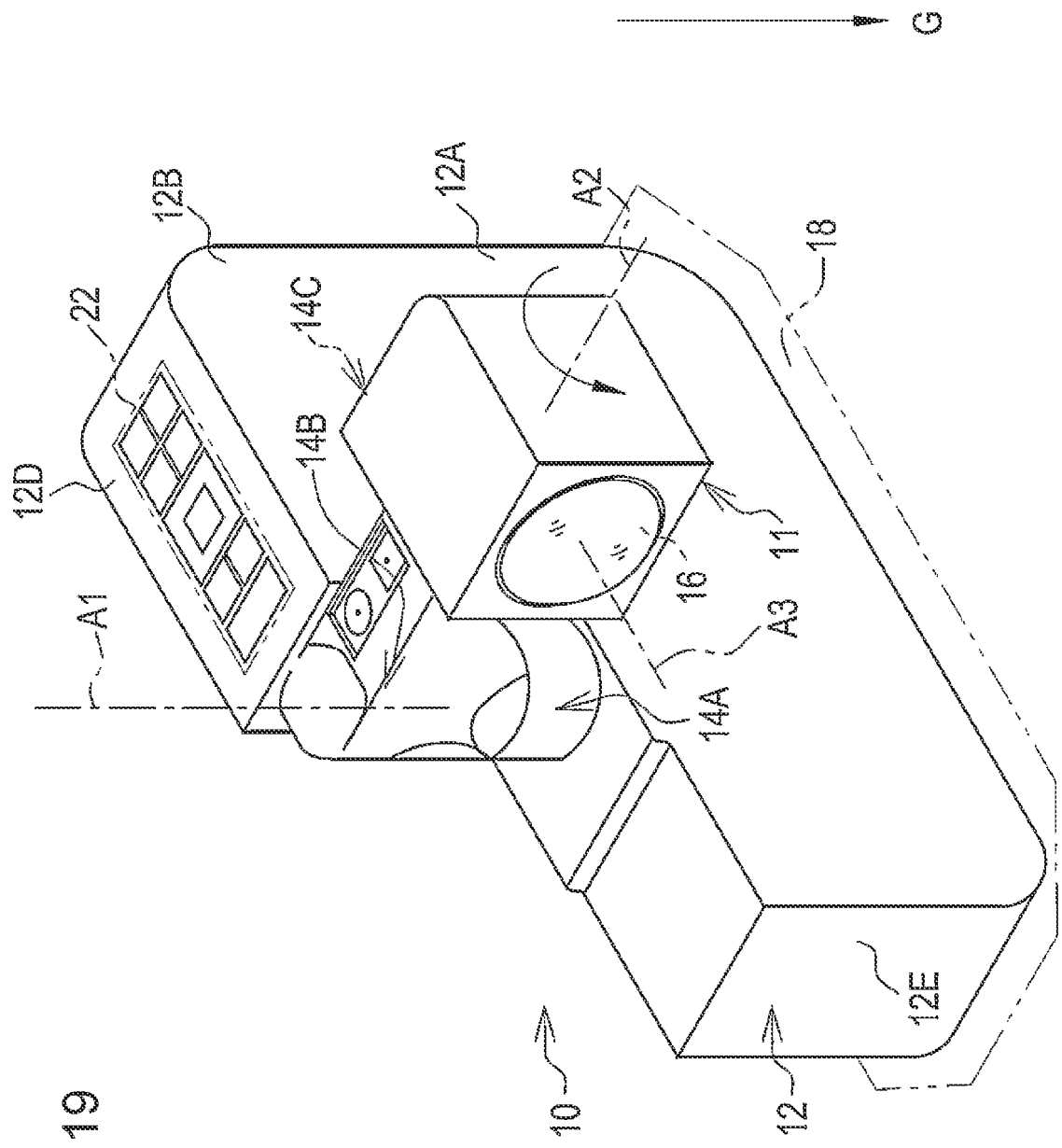
FIG. 19 is a perspective view of the projection lens in an orientation in which a direction of a second optical axis is a horizontal direction.
Figure 20:
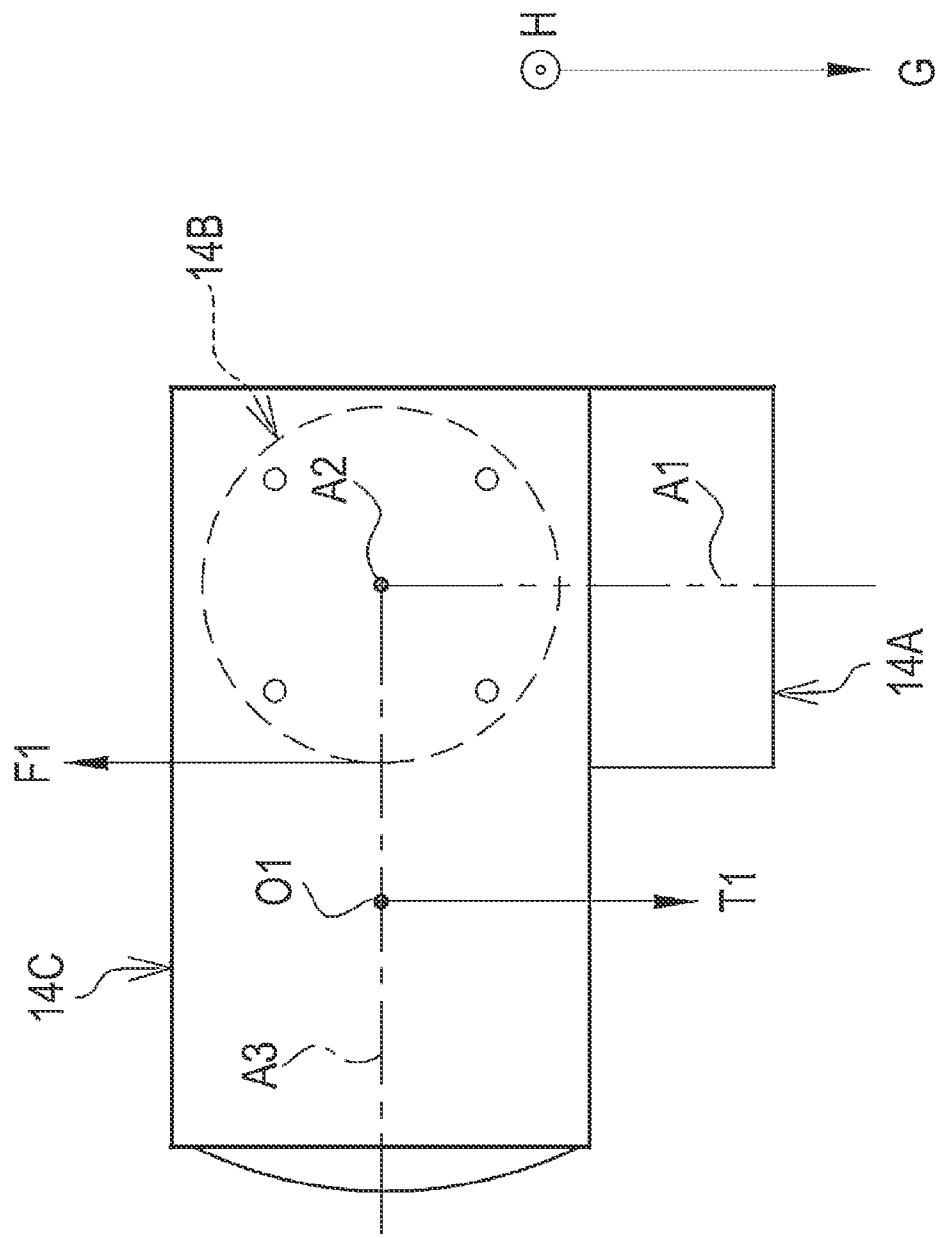
FIG. 20 is an explanatory view of a rotation force T1 and a rotation restriction force F1.

In the present example, the rotation restriction force is set as follows. First, as illustrated in FIGS. 19 and 20, when the direction of the second optical axis A2 is a horizontal direction H that is orthogonal to a gravitation direction G, a rotation force that rotates the exit-side end portion 14C around the second optical axis A2 by the action of gravitation is T1. The rotation force T1 is a rotation force that acts upon the position of a center of gravity O1 of the exit-side end portion 14C. The rotation force T1 corresponds to a rotation force that rotates the third lens barrel portion 43 around the second optical axis A2.

When the direction of the second optical axis A2 is the horizontal direction H, the rotation restriction force that restricts the rotation of the exit-side end portion 14C around the second optical axis A2 and that is generated based on the pressing force of the ball plungers 68, which are first pressing portions, is F1. The rotation restriction force F1 corresponds to a rotation restriction force that restricts the rotation of the third lens barrel portion 43 around the second optical axis A2.

The relationship between the rotation force T1 and the rotation restriction force F1 is set so as to satisfy the following Formula (1):

$$F1 > T1 \qquad \text{Formula (1).}$$

When the relationship between the rotation force T1 and the rotation restriction force F1 satisfies Formula (1), even when the orientations of the projection lens 11 are the orientations illustrated in FIGS. 19 and 20, the exiting direction of light of the exit-side end portion 14C is not rotated by the action of gravitation.

Even in the first lens barrel portion 41, second engaging portions that are similar to the first engaging portions of the second lens barrel portion 42 are provided. The second engaging portions are constituted by the ball bearings 78 corresponding to the second protrusion portions (refer to FIG. 9) and a second abutment surface (not illustrated) that is disposed so as to face the ball bearings 78 in the direction of the first optical axis A1. The second abutment surface is formed at an inner peripheral surface of the outer tube 41B and at one surface of an inner portion of an accommodation groove that accommodates the ball bearings 78. Since the structures of the accommodation groove and the second abutment surface are the same as those of the accommodation groove 88 and the first abutment surface 88A of the second lens barrel portion 42, they are not illustrated and described.

As in the second lens barrel portion 42, even in the first lens barrel portion 41, the stronger the pressing force of the ball plungers 74, which are second pressing portions, is, the more backlash of the outer tube 41B is suppressed with respect to the inner tube 41A.

The stronger the pressing force of the ball plungers 74 is, the larger the friction force between the ball bearings 78 and the abutment surface (not illustrated) and the friction force between the ball plungers 74 and the end surface 41A1 (refer to FIG. 12) are. Due to these friction forces, a rotation restriction force that restricts rotation of the outer tube 41B, that is, a rotation restriction force that restricts rotation of the intermediate portion 14B and the exit-side end portion 14C around the first optical axis A1 is generated. When the rotation restriction force is large, an operation force for rotating the intermediate portion 14B and the exit-side end portion 14C is also large. In contrast, when the rotation restriction force is small, the intermediate portion 14B and the exit-side end portion 14C may rotate accidentally. Considering such circumstances, a rotation restriction force that is generated based on the pressing force of the ball plungers 74 is set.

Figure 21:
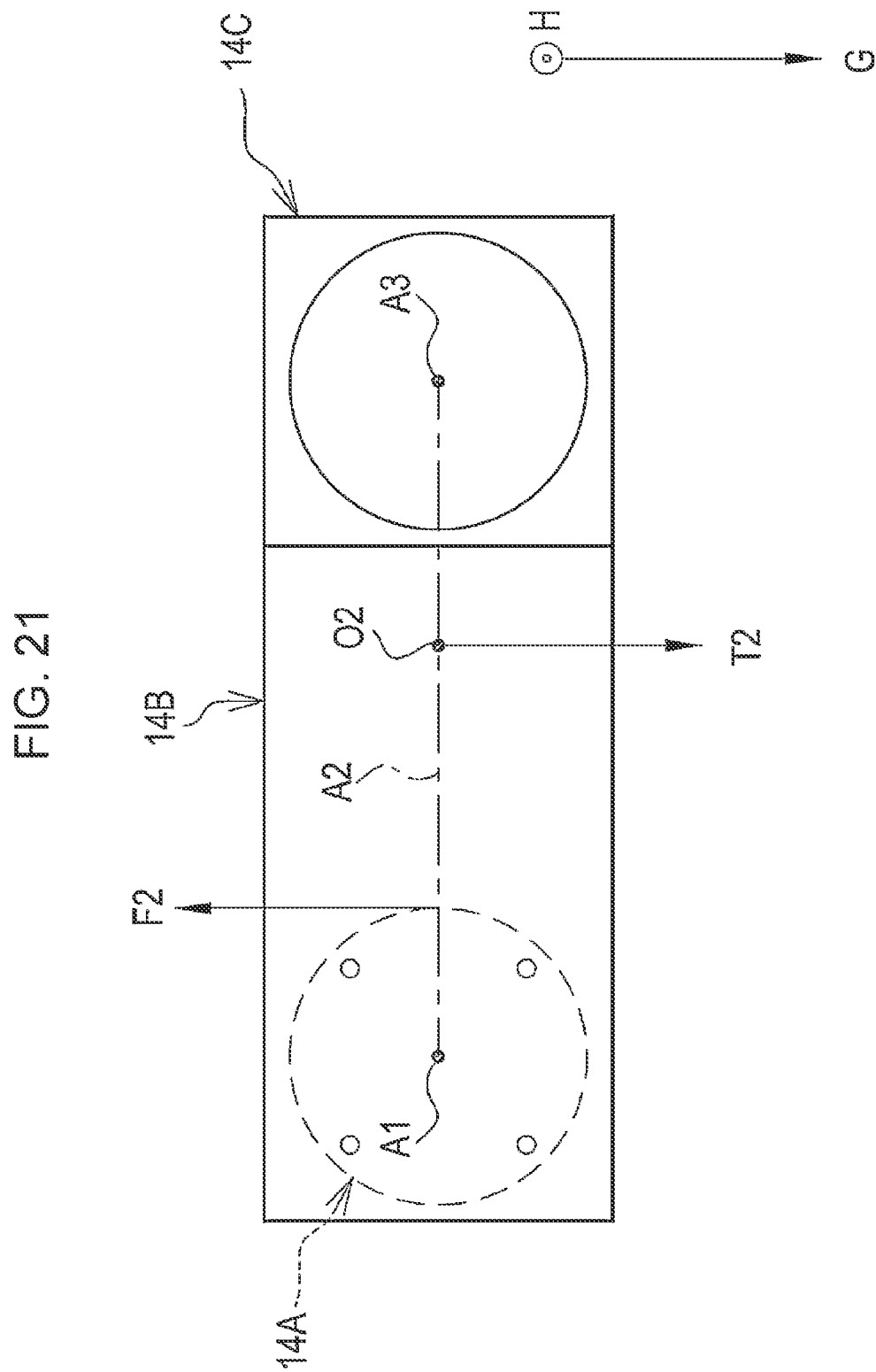
FIG. 21 is an explanatory view of a rotation force T2 and a rotation restriction force F2.

In the present example, the rotation restriction force is set as follows. As illustrated in FIG. 21, first, when the direction of the first optical axis A1 is a horizontal direction H that is orthogonal to a gravitation direction G, a rotation force that rotates the intermediate portion 14B and the exit-side end portion 14C around the first optical axis A1 by the action of gravitation force is T2. The rotation force T2 is a rotation force that acts upon the position of a center of gravity O2 of the intermediate portion 14B and the exit-side end portion 14C. The rotation force T2 corresponds to a rotation force that rotates the second lens barrel portion 42 and the third lens barrel portion 43 around the first optical axis A1.

When the direction of the first optical axis A1 is the horizontal direction H, the rotation restriction force that restricts the rotation of the intermediate portion 14B and the exit-side end portion 14C around the first optical axis A1 and that is generated based on the pressing force of the ball plungers 74, which are second pressing portions, is F2. The rotation restriction force F2 corresponds to a rotation restriction force that restricts the rotation of the second lens barrel portion 42 and the third lens barrel portion 43 around the first optical axis A1.

The relationship between the rotation force T2 and the rotation restriction force F2 is set so as to satisfy the following Formula (2):

$$F2 > T2 \qquad \text{Formula (2).}$$

When the relationship between the rotation force T2 and the rotation restriction force F2 satisfies Formula (2), even when the orientation of the projection lens 11 is the orientation illustrated in FIG. 21, the exiting direction of light of the intermediate portion 14B and the exit-side end portion 14C is not rotated by the action of gravitation.

Since the rotation force T2 is larger than the rotation force T1 due to the influence of the weight of the intermediate portion 14B, the relationship between the rotation restriction force F1 and the rotation restriction force F2 is set so as to satisfy the following Formula (3):

$$F1 < F2 \qquad \text{Formula (3).}$$

Figure 22:
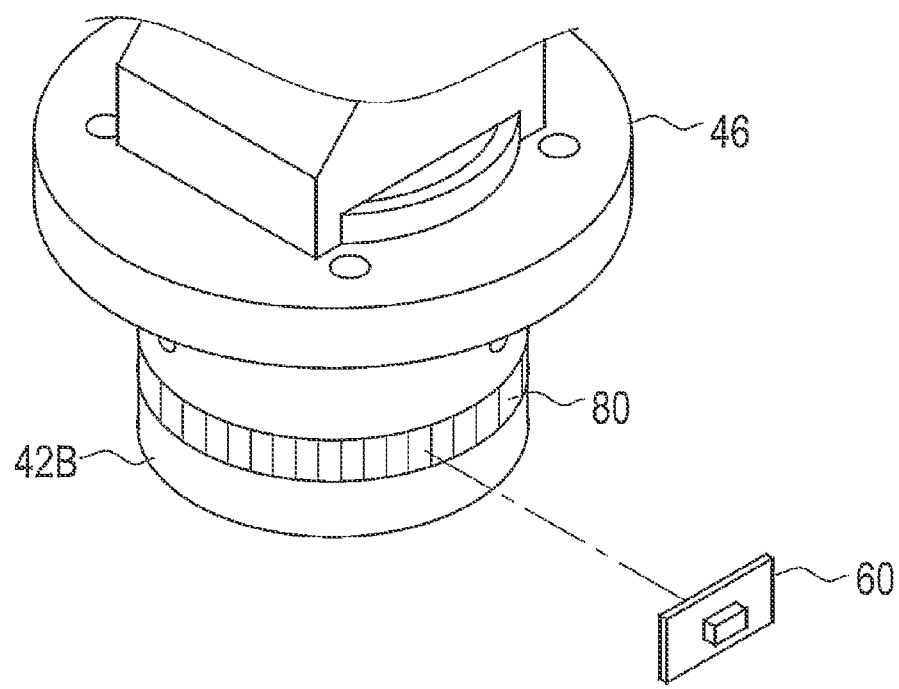
FIG. 22 is an explanatory view of a rotation-position detection mechanism.
Figure 23:
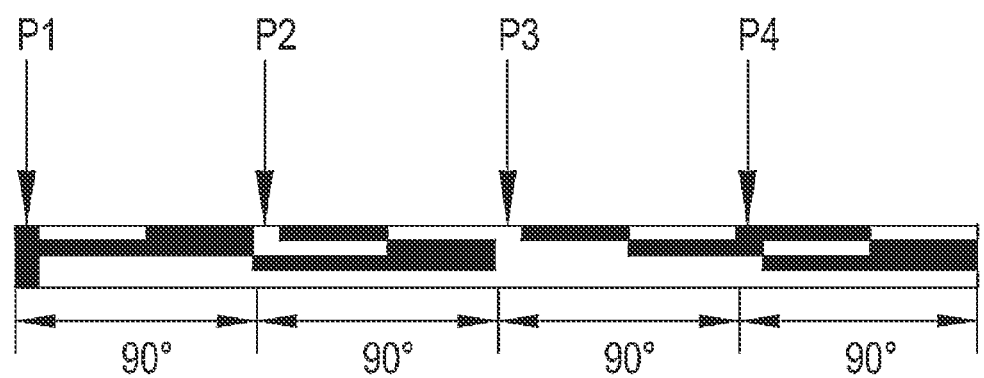
FIG. 23 is an explanatory view of a pattern formation portion.

As illustrated in FIGS. 22 to 24, the second rotation-position detection mechanism that is constituted by the pattern formation portion 80 and the second rotation-position detection sensor 60 detects the rotation position of the inner tube 42B around the second optical axis A2 with respect to the outer tube 42A in the second lens barrel portion 42. When the inner tube 42B rotates, the third lens barrel portion 43 through which the third optical axis A3 extends rotates around the second optical axis A2. When, as with the projection lens 11, a projection lens includes a bending optical system having a plurality of optical axes that rotate with respect to each other, a display orientation of an image P that is projected onto the screen 36 changes in accordance with the rotation of the optical axes. The second rotation-position detection mechanism detects the rotation position of the inner tube 42B and sends the detected rotation position to the control board of the main body portion 12.

As illustrated in FIG. 23, for example, a plurality of patterns that differ are formed at each rotation position of the inner tube 42B at the pattern formation portion 80. The second rotation-position detection sensor 60 is, for example, a photosensor that optically reads the plurality of patterns.

For example, in addition to four patterns indicating four rotation positions P1 to P4 that are set at an interval of 90°, patterns indicating two rotation positions each between corresponding ones of the rotation positions P1 to P4 are formed at the pattern formation portion 80. That is, a total of 12 different patterns are formed at the pattern formation portion 80. The second rotation-position detection sensor 60 optically reads the 12 different patterns, and sends detection signals indicating the rotation positions that are in accordance with the respective patterns to the control board of the main body portion 12. Two patterns exist between the rotation position P1 and the rotation position P2, and, due to these patterns, the second rotation-position detection sensor 60 can detect the current rotation position for every 45°.

Figure 24A:
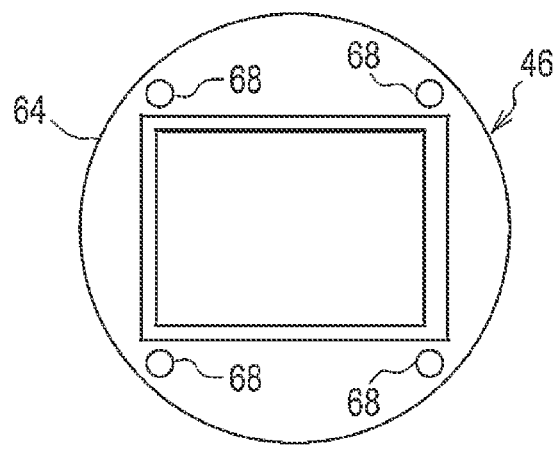
FIGS. 24A to 24C each illustrate a transition in a rotation position of a first rotary tube, with FIG. 24A illustrating an initial position, FIG. 24C illustrating a position after rotation by 90° from the initial position, and FIG. 24B illustrating an intermediate position.
Figure 24B:
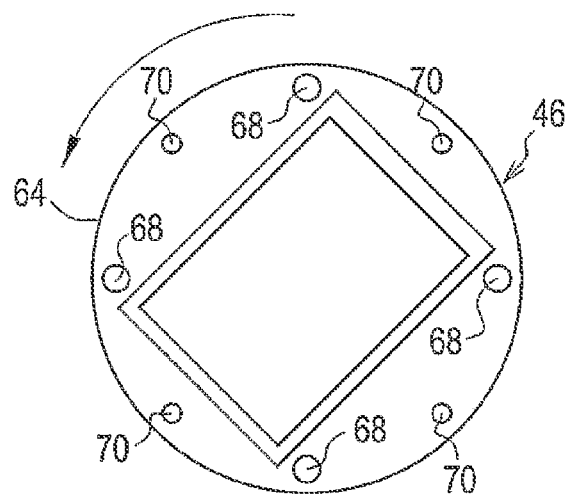
Figure 24C:
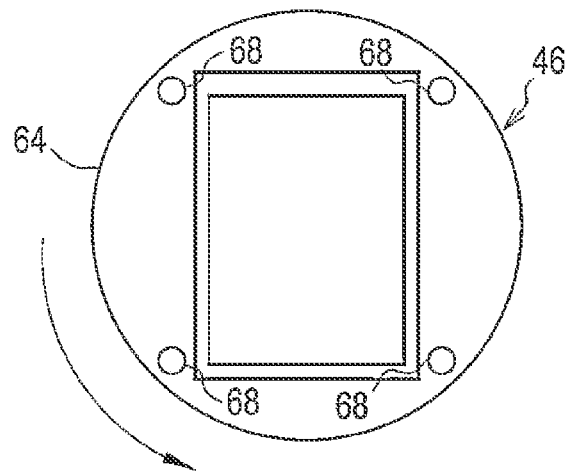

FIGS. 24A to 24C each illustrate a rotation position of the inner tube 42B (refer to FIG. 22) that rotates together with the second mirror holding portion 46. In FIGS. 24A to 24C, the rotation position of the inner tube 42B illustrated in FIG. 24A is an initial rotation position P1, and the rotation position illustrated in FIG. 24C is a rotation position P4 after rotation by 90° in a counterclockwise direction from the rotation position P1. In the state illustrated in FIG. 24A, the second rotation-position detection mechanism sends a detection signal indicating the rotation position P1 to the main body portion 12. Then, as illustrated in FIG. 24B, when the inner tube 42B starts to rotate in the counterclockwise direction from the rotation position P1, the second rotation-position detection mechanism sends a detection signal that is in accordance with a rotation position between the rotation position P1 and the rotation position P4. When the inner tube 42B rotates by 90° in the counterclockwise direction, the second rotation-position detection mechanism sends a detection signal indicating the rotation position P4. In the present embodiment, the positions from the rotation position P1 to the rotation position P4 correspond to the positions at which the ball plungers 68 are inserted into the fitting holes 70. Therefore, at the rotation positions P1 to P4, the projection lens 11 can stably project an image. In other words, the second rotation-position detection mechanism of the present embodiment can detect the positions at which the ball plungers 68 are inserted into the fitting holes 70 and the positions at which the ball plungers 68 are not inserted into the fitting holes 70.

The control board controls the image formation unit 26 based on a received rotation position. Therefore, a display orientation of the image P is switched to a suitable orientation.

Note that a first rotation-position detection mechanism that detects the rotation position of the outer tube 41B with respect to the inner tube 41A is provided at the first lens barrel portion 41. The first rotation-position detection mechanism is constituted by the first rotation-position detection sensor 59 that is provided at the outer tube 41B and a pattern formation portion that is similar to the pattern formation portion 80 and that is provided at the inner tube 41A.

The first rotation-position detection mechanism and the second rotation-position detection mechanism detect the rotation position of the second lens barrel portion 42 and the rotation position of the third lens barrel portion 43. To be exact, the control board of the main body portion 12 switches the display orientation of the image P in accordance with a combination of these two rotation positions.

The operations of the structure above are described below. First, in the accommodated state of the projection lens 11, since the projection lens 11 fits in the accommodation portion (recessed portion) 12C, as illustrated in FIG. 1, in plan view, the projector 10 has a substantially rectangular parallelepiped shape as a whole. Therefore, in the accommodated state, the projector 10 is easily carried and accommodated.

When the projector 10 is used, depending upon use situations, the projector 10 is set at a use location in the horizontally-placed orientation illustrated in FIG. 2 or the vertically-placed orientation illustrated in FIG. 3. In the projection lens 11, by rotating the exit-side end portion 14C and the intermediate portion 14B around the first optical axis A1, the exit lens 16 is exposed to the outside. Further, by rotating the exit-side end portion 14C around the second optical axis A2, the projection direction of the exit lens 16 is changed.

When the exit-side end portion 14C is rotated around the second optical axis A2, the third lens barrel portion 43 in the exit-side end portion 14C rotates around the second optical axis A2. The inner tube 42B rotates around the second optical axis A2 as a result of rotating the third lens barrel portion 43. In the second lens barrel portion 42, the inner tube 42B and the outer tube 42A include the ball bearings 72, which are examples of first protrusion portions, and the abutment surface 88A, which is an example of a first abutment surface (refer to FIGS. 16A and 16B). The ball plungers 68, which are examples of first pressing portions, press the outer tube 42A in the direction of the second optical axis A2, and the ball bearings 72 press against the abutment surface 88A. Therefore, the inner tube 42B rotates with respect to the outer tube 42A with backlash suppressed.

Consequently, it is possible to suppress optical-axis shifts caused by the rotation of the inner tube 42B, which is a first rotary tube, around the second optical axis A2.

Since the ball bearings 72 are used as examples of first protrusion portions, the friction force between the first protrusion portions and the first abutment surface is reduced. Therefore, compared with when the ball bearings 72 are not used, the inner tube 42B, which is an example of a first rotary tube, can be smoothly rotated while optical-axis shifts are suppressed.

When the third lens barrel portion 43 rotates around the second optical axis A2, the state of each ball plunger 68 is switched between the fitting state illustrated in FIG. 11A in which each ball plunger 68 is fitted to the fitting hole 70 and the move-out state illustrated in FIG. 11B in which each ball plunger 68 moves out of the fitting hole 70.

When the states of the ball plungers 68 have been changed from the move-out state to the fitting state by switching between the fitting state and the move-out state of the ball plungers 68, a user senses a click feeling via a tactile feel and/or sound, as a result of which it is possible to detect a rotation position determined at the fitting holes 70. The fitting holes 70 are disposed at an interval of 90°. Therefore, the user can detect the four rotation positions corresponding to four display orientations of the image P that have been preset.

Since the ball plungers 68, which are examples of first pressing portions, that are fitted to the fitting holes 70 are used, elastic deformation of the springs 68B makes it possible to smoothly switch between the fitting state and the move-out state.

Since the ball plungers 68 are provided at the outer peripheral surface of the second mirror holding portion 46, this is convenient in terms of removing them at the time of maintenance.

A plurality of the ball plungers 68, which are examples of first pressing portions, are provided. Therefore, the inner tube 42B, which is an example of a first rotary tube, can rotate stably. At least three ball plungers 68 are provided. As described above, three ball bearings 72, which are examples of first pressing portions, are provided and are disposed apart from each other at equal intervals of 120° in the peripheral direction around the second optical axis A2 (refer to FIGS. 16A and 16B). Since the outer tube 42A and the inner tube 42B are supported at three points by the three ball bearings 72, the inner tube 42B can be rotated more stably. Similarly to the ball bearings 72, three ball bearings 78, which are examples of second pressing portions, are provided, and are disposed apart from each other at equal intervals of 120° in the peripheral direction around the first optical axis A1. Therefore, the same effect as that provided by the ball bearings 72 is provided.

As illustrated in FIGS. 19 and 20, when the second optical axis A2 is the horizontal direction H, the rotation restriction force F1 that restricts the rotation of the third lens barrel portion 43, which is an example of an exit-side lens barrel portion, is larger than the rotation force T1 that rotates the third lens barrel portion 43 around the second optical axis A2 by the action of gravitation. Therefore, even in the state illustrated in FIG. 19, accidental rotation of the second lens barrel portion 42 is suppressed.

In the first lens barrel portion 41, the outer tube 41B, which is an example of a second rotary tube, rotates around the first optical axis A1 with respect to the inner tube 41A, which is an example of a second fixed tube. Even the first lens barrel portion 41 includes the ball bearings 78.

Therefore, it is possible to suppress optical-axis shifts caused by the rotation of the outer tube 41B, which is an example of a second rotary tube, around the first optical axis A1.

As illustrated in FIG. 21, when the second optical axis A2 is the horizontal direction H, the rotation restriction force F2 that restricts the rotation of the third lens barrel portion 43, which is an example of an exit-side lens barrel portion, and the second lens barrel portion 42 is larger than the rotation force T2 that rotates the third lens barrel portion 43 and the second lens barrel portion 42 around the first optical axis A1 by the action of gravitation. Therefore, even in the state illustrated in FIG. 21, accidental rotation of the third lens barrel portion 43 and the second lens barrel portion 42 is suppressed.

Further, the rotation restriction force F1 is smaller than the rotation restriction force F2. The relationship between the magnitude of the rotation restriction force F1 and the magnitude of the rotation restriction force F2 is set in accordance with the rotation force T1 and the rotation force T2. Therefore, the rotation restriction force F1 of the third lens barrel portion 43 does not become excessively large.

The ball bearings 72, which are examples of first protrusion portions, are provided at the inner tube 42B, which is an example of a first rotary tube. The abutment surface 88A is formed at one surface of the accommodation groove 88 that is formed in the inner peripheral surface of the outer tube 42A, which is an example of a first fixed tube. Therefore, assembly is facilitated compared with when the ball bearings 72 are provided at the inner peripheral surface of the outer tube 42A and the accommodation groove 88 is formed at the outer peripheral surface of the inner tube 42B.

This is because, when the ball bearings 72 are provided at the inner peripheral surface of the outer tube 42A, the head portion of each ball bearing 72 faces inward in a radial direction of the outer tube 42A. Note that the ball bearings 72 may be provided at the outer tube 42A.

The ball plungers 74 are mounted on the first mirror holding portion 44, and are disposed in the inner portion of the first mirror holding portion 44. The first mirror holding portion 44 can be separated from the outer tube 41B. Therefore, since the ball plungers 74 are exposed by separating the first mirror holding portion 44 and the outer tube 41B from each other, the ball plungers 74 are easily replaced and repaired.

In FIGS. 24A to 24C, the number of ball plungers 68 and the number of fitting holes 70 are the same. However, the number of fitting holes 70 may be less than the number of ball plungers 68. In a specific example, the number of ball plungers 68 may be four, and the number of fitting holes 70 may be two. In this case, at least two ball plungers 68 are not fitted to the fitting holes 70 (state in FIG. 11B). When the ball plungers 68 are not fitted to the fitting holes 70 as illustrated in FIG. 11B, compared with when the ball plungers 68 are fitted to the fitting holes 70 as illustrated in FIG. 11A, the springs 68B strongly press the balls 68A, as a result of which the rotation restriction force is increased. In other words, when the projection lens 11 includes at least one or more fitting holes 70 and a plurality of ball plungers 68, and the number of fitting holes is less than the number of ball plungers 68, the rotation restriction force is increased compared with when the number of fitting holes 70 and the number of ball plungers 68 are the same.

The plurality of ball plungers may include two or more types of ball plungers whose pressing forces differ from each other.

Figure 25:
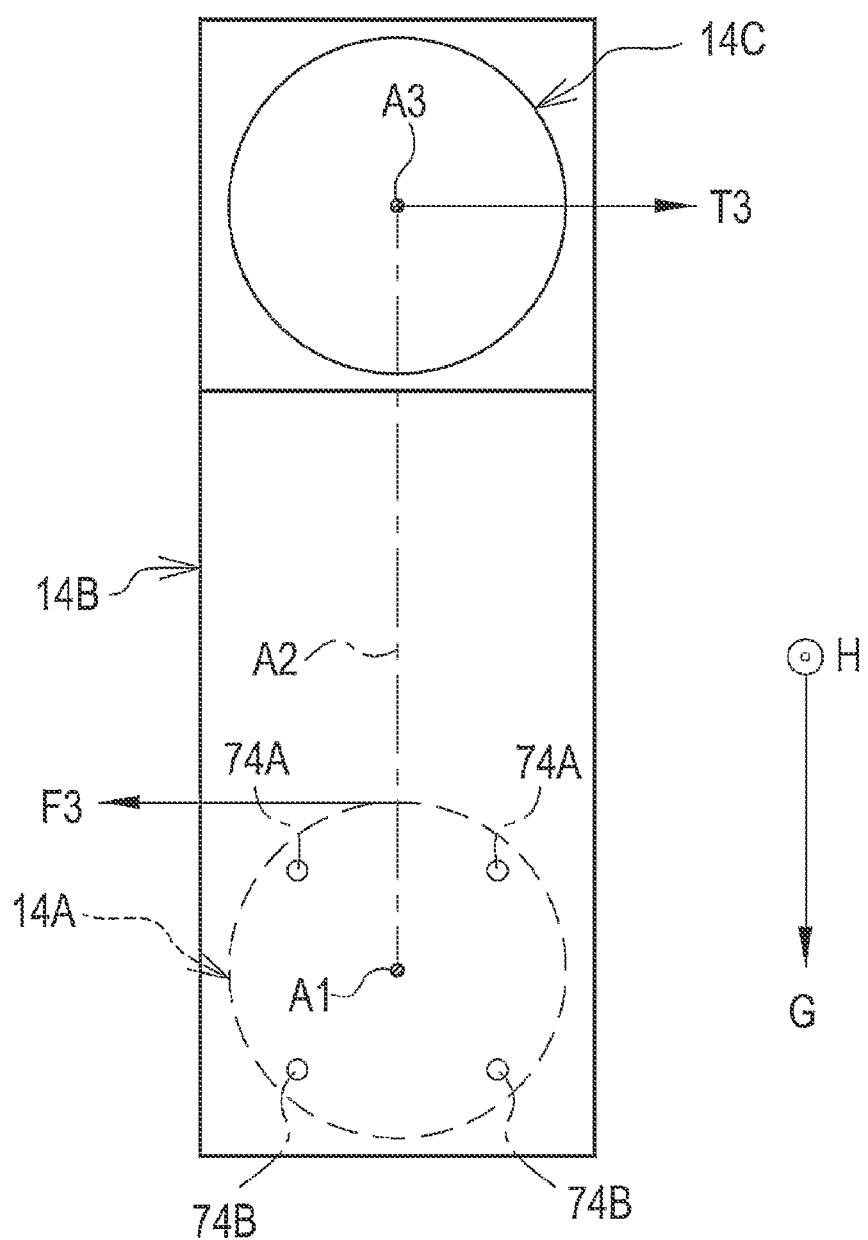
FIG. 25 illustrates the projection lens when the direction of the second optical axis is a gravitation direction.

For example, as illustrated in FIG. 25, among the plurality of ball plungers 74 that are provided at the first lens barrel portion 41, first ball plungers 74A having a relatively large pressing force and second ball plungers 74B having a relatively small pressing force may be provided. When the direction of the second optical axis A2 is the gravitation direction G, the first ball plungers 74A are disposed on an exit side. The second ball plungers 74B are disposed on an incidence side.

The orientation of the projection lens 11 illustrated in FIG. 25 is the orientation illustrated in FIG. 4. When such a structure is used, it is possible to increase a rotation restriction force F3 that is generated based on the pressing force. When the rotation restriction force F3 is large, even if a rotation force T3 that rotates the projection lens 11 around the first optical axis A1 is applied to the projection lens 11, the projection lens 11 is further suppressed from accidentally falling sideways. In this way, when the pressing forces of the plurality of ball plungers differ from each other, an advantageous effect may be provided. This is because, in this case, when the pressing force of the second ball plungers 74B is also large, the rotation restriction force when the intermediate portion 14B is rotated with respect to the incidence-side end portion 14A may become excessively strong.

In the present example, the first pressing portions are described as pressing the first press surface facing the first pressing portions in the direction of the second optical axis A2. When the first pressing portions are provided primarily for the purpose of causing a user to sense a click feel instead of suppressing backlash of the first rotary tube and the first fixed tube, a pressing direction of the first pressing portions need not be parallel to the second optical axis A2. For example, with a side surface of the first rotary tube and a side surface of the first fixed tube in the peripheral direction around the second optical axis A2 being press surfaces, the first pressing portions that press the first press surfaces from a direction orthogonal to the second optical axis A2 may be provided.

The projection lens 11 of the present example includes the first conduction portion 82 having the fixed electrodes 82A that are provided at the outer tube 42A, which is an example of a first fixed tube, and the rotary electrodes 82B that are provided at the inner tube 42B, which is an example of a first rotary tube. Therefore, in the projection lens in which electrical conduction is required on the side of the first rotary tube and on the side of the first fixed tube, even if the rotatable range of the first rotary tube is 360° or greater, there is no concern about a cable being twisted.

As illustrated in FIG. 10, the fixed electrodes 82A are ring-shaped electrodes, the rotary electrodes 82B are partial contact electrodes that partially contact the ring-shaped electrodes, and the fixed electrodes 82A and the rotary electrodes 82B while being kept in a contact state rotate relative to each other. In this way, since the fixed electrodes 82A and the rotary electrodes 82B are normally in contact with each other, compared with when they are repeatedly brought into and out of contact with each other, the state of contact is stabilized. However, the fixed electrodes 82A may be electrodes that are partially formed instead of electrodes that are provided in the form of a ring.

As illustrated in FIG. 14, since the rotary electrodes 82B, which are examples of partial contact electrodes, are in contact with the fixed electrodes 82A, which are examples of ring-shaped electrodes, in an elastically deformed state, the state of contact becomes more stable. Each rotary electrode 82B, which is an example of a partial contact electrode, is such that, at the intermediate portion of the belt-shaped strip 82B1, both ends of the strip 82B1 are bent in the direction of the ring-shaped electrodes, and both of the ends are in contact with the ring-shaped electrodes. Therefore, the state of contact becomes more stable.

There are a plurality of partial contact electrodes, and the plurality of partial contact electrodes are disposed apart from each other in the peripheral direction of the ring-shaped electrodes. Therefore, the state of contact becomes more stable.

In the radial direction of the outer tube 42A and the inner tube 42B, the first conduction portion 82 is disposed on the outer side with respect to the ball plungers 68. Therefore, a cable is easily routed.

In the first lens barrel portion 41, a cable-type conduction portion that uses the cable 86B is provided as a second conduction portion for performing electrical conduction on the side of the outer tube 41B, which is an example of a second rotary tube, and on the side of the inner tube 41A, which is an example of a second fixed tube.

In the first lens barrel portion 41, the rotatable range of the outer tube 41B, which is a second rotary tube, is 180°, and is less than 360°. In contrast, in the second lens barrel portion 42, the rotatable range of the inner tube 42B, which is a first rotary tube, is 360° or greater. When the rotatable range of the rotary tube is less than 360°, there is less concern about a cable being twisted than when the rotatable range is 360° or greater.

A cableless-type conduction portion constituted by the fixed electrodes 82A and the rotary electrodes 82B as with the first conduction portion 82 costs more than the cable-type second conduction portion. Therefore, in the first lens barrel portion 41 in which there is little concern about a cable being twisted, it is possible to ensure a highly reliable conduction and to suppress costs by using a cable type.

Note that, although, as the cableless-type conduction portion, the conduction portion having the fixed electrodes 82A and the rotary electrodes 82B has been described as an example, a non-contact power-feeding type may also be used as the cableless-type conduction portion. Examples of the noncontact power-feeding type include a type that utilizes electromagnetic induction and a type that utilizes magnetic resonance, and either of these types may be used.

As disclosed in JP2001-203022A, the fixed electrodes 82A or the rotary electrodes 82B may be elastic conductive portions that are elastically deformed (for example, spring connectors). On the other hand, a conductive projection portion in which a projection is provided at a cylinder portion and a surface of the projection is provided with a conductive film may be provided. Therefore, by rotating the second rotary tube, the conductive projection portion presses the elastic conductive portion at a particular rotation position. Due to the pressing force and the elastic force of elastic members (for example, springs) of the elastic conductive portion, the elastic conductive portion and the conductive projection portion are brought into close contact with each other and are brought into an electrical conduction state.

Although, in the embodiment above, a projection lens having three optical axes formed by bending an optical axis twice has been described as an example, the technology of the present disclosure may be applied to a projection lens having two optical axes formed by bending an optical axis once. The technology of the present disclosure may also be applied to a projection lens having four or more optical axes. When a projection lens having four or more optical axes is used, among the four or more optical axes, the optical axis existing relatively on the exit side is an exit-side optical axis, and the optical axis just in front of the incidence side with respect to the exit-side optical axis is a first incidence-side optical axis.

Note that, although, in the example above, motors and solenoids are given as examples of the electrical driving units 51 to 54, other mechanisms may be used as long as they are components that perform driving by using electricity. For example, as described in JP2017-142726A, the projector 10, which is a projection device, may include an electronic pen that is capable of writing, for example, characters on a projection surface. In this case, the electrical driving units may be driving units of an image pickup element that captures emitted light produced as a result of writing with the electronic pen.

As the image formation panel 32 corresponding to an electro-optical element, instead of a DMD, a transmission-type image formation panel using a LCD may be used. In addition, instead of a DMD, a panel using a self-luminous element, such as a LED (light emitting diode) and/or an organic EL (electro luminescence) element, may be used. As the reflective portion, instead of a specular reflective type mirror, a total reflective type mirror may be used.

In the example above, although the use of a laser light source as the light source 34 is given as an example, the light source 34 is not limited thereto, and a mercury lamp and/or a LED may also be used as the light source 34. In the example above, although a blue laser light source and a yellow fluorescent body are used, instead of the yellow fluorescent body, a green fluorescent body and a red fluorescent body may be used. In addition, instead of the yellow fluorescent body, a green laser light source and a red laser light source may be used.

In the present specification, "A and/or B" means the same as "at least one of A or B". That is, "A and/or B" may mean only A, only B, or a combination of A and B. In the present specification, the meaning of "A and/or B" also similarly applies to expressions in which three or more things are connected by "and/or".

All documents, patent applications, and technical standards that are described in the present specification are incorporated by way of reference in the present specification to the same extent as when each of the documents, patent applications, and technical standards are specifically and individually described as being incorporated herein by way of reference.

From the descriptions above, it is possible to understand the description of a projection lens that is described in the appendix below.

APPENDIX 1

A projection lens that is to be mounted on a housing of a projection device having an electro-optical element includes
a lens barrel that accommodates an optical system from which light incident from the housing exits, and that has a first rotary tube that rotates around an optical axis and a first fixed tube at which the first rotary tube is rotatably mounted,
a first conduction portion for performing electrical conduction, the first conduction portion having a fixed electrode that is provided at the first fixed tube and a rotary electrode that is provided at the first rotary tube and that rotates as a result of rotating the first rotary tube, the rotary electrode being disposed at a position that faces the fixed electrode and contacting the fixed electrode at least at a rotation position that has been preset, and
a first pressing portion that is provided at one of the first rotary tube and the first fixed tube,
wherein the fixed electrode and the rotary electrode are disposed so as to face each other in a direction of the optical axis,
wherein the first pressing portion protrudes from one of the first rotary tube and the first fixed tube and presses the other of the first rotary tube and the first fixed tube to form a gap between the first rotary tube and the first fixed tube, and
wherein the rotary electrode contacts the fixed electrode in the gap.

What is claimed is:

1. A projection lens that is to be mounted on a housing of a projection device having an electro-optical element, the projection lens comprising:
a lens barrel that accommodates an optical system from which light incident from the housing exits, and that has a first rotary tube that rotates around an optical axis and a first fixed tube at which the first rotary tube is rotatably mounted; and
a first conduction portion for performing electrical conduction, the first conduction portion having a fixed electrode that is provided at the first fixed tube and a rotary electrode that is provided at the first rotary tube and that rotates as a result of rotating the first rotary tube, the rotary electrode being disposed at a position that faces the fixed electrode and contacting the fixed electrode at least at a rotation position that has been preset.

2. The projection lens according to claim 1, wherein one of the fixed electrode and the rotary electrode is a planar electrode that extends in a peripheral direction around the optical axis, and the other of the fixed electrode and the rotary electrode is a partial contact electrode that partially contacts the planar electrode, and
wherein the planar electrode and the partial contact electrode while being kept in a contact state rotate relative to each other.

3. The projection lens according to claim 2, wherein the partial contact electrode in an elastically deformed state contacts the planar electrode.

4. The projection lens according to claim 3, wherein a plurality of the partial contact electrodes are provided, and
wherein the plurality of the partial contact electrodes are disposed apart from each other in the peripheral direction around the optical axis.

5. The projection lens according to claim 3, comprising:
a rotary portion that is mounted at the first rotary tube and that rotates as a result of rotating the first rotary tube,
wherein the rotary electrode is mounted at the rotary portion.

6. The projection lens according to claim 2, wherein a plurality of the partial contact electrodes are provided, and
wherein the plurality of the partial contact electrodes are disposed apart from each other in the peripheral direction around the optical axis.

7. The projection lens according to claim 2, comprising:
a rotary portion that is mounted at the first rotary tube and that rotates as a result of rotating the first rotary tube,
wherein the rotary electrode is mounted at the rotary portion.

8. The projection lens according to claim 1, wherein one of the fixed electrode and the rotary electrode is a conductive projection portion having a conductive film, and the other of the fixed electrode and the rotary electrode is an elastic conductive portion that elastically deforms, and
wherein, at the rotation position, the conductive projection portion and the elastic conductive portion contact each other.

9. The projection lens according to claim 1, comprising:
a rotary portion that is mounted at the first rotary tube and that rotates as a result of rotating the first rotary tube,
wherein the rotary electrode is mounted at the rotary portion.

10. The projection lens according to claim 1, wherein the fixed electrode and the rotary electrode are disposed so as to face each other in a direction of the optical axis, and
wherein the projection lens comprises
a first protrusion portion that is provided at one of the first rotary tube and the first fixed tube and that protrudes from the one of the first rotary tube and the first fixed tube;
a first abutment surface that is provided at the other of the first rotary tube and the first fixed tube and that faces and abuts upon the first protrusion portion; and
a first pressing portion that presses the first protrusion portion against the first abutment surface by pressing at least one of the first rotary tube or the first fixed tube in the direction of the optical axis.

11. The projection lens according to claim 10, wherein the first pressing portion is provided at one of the first rotary tube and the first fixed tube,
wherein the projection lens comprises
a first press surface that is provided at the other of the first rotary tube and the first fixed tube, that is disposed so as to face the first pressing portion in the direction of the optical axis, and that is pressed by the first pressing portion; and at least one first fitting hole that is provided in the first press surface and that is fitted to the first pressing portion, and wherein when the first rotary tube rotates around the optical axis, a state of the first pressing portion is switched between a fitting state in which the first pressing portion is fitted to the first fitting hole and a move-out state in which the first pressing portion moves out of the first fitting hole.

12. The projection lens according to claim 10, wherein, with respect to the optical axis, the first conduction portion is disposed on an outer side with respect to the first pressing portion.

13. The projection lens according to claim 1, wherein the optical system is a bending optical system that comprises at least two optical axes, the two optical axes being an exit-side optical axis along which the light incident from the housing exits and a first incidence-side optical axis that is disposed on an incidence side with respect to the exit-side optical axis and that is bent with respect to the exit-side optical axis, and wherein the lens barrel comprises
an exit-side lens barrel portion that accommodates an exit-side optical system having the exit-side optical axis and that rotates around the first incidence-side optical axis; and
a first incidence-side lens barrel portion that is disposed on an incidence side with respect to the exit-side lens barrel portion and through which the first incidence-side optical axis extends, the first incidence-side lens barrel portion having the first rotary tube and the first fixed tube, the first rotary tube rotating around the first incidence-side optical axis as a result of rotating the exit-side lens barrel portion.

14. The projection lens according to claim 13, wherein the bending optical system comprises a second incidence-side optical axis that is disposed on an incidence side with respect to the first incidence-side optical axis and that is bent with respect to the first incidence-side optical axis, and wherein the projection lens further comprises
a second incidence-side lens barrel portion that is disposed on an incidence side with respect to the first incidence-side lens barrel portion and through which the second incidence-side optical axis extends, the second incidence-side lens barrel portion having a second rotary tube that rotates around the second incidence-side optical axis as a result of rotating the first incidence-side lens barrel portion and a second fixed tube at which the second rotary tube is rotatably mounted.

15. The projection lens according to claim 14, comprising:
a second conduction portion for performing electrical conduction on a side of the second rotary tube and on a side of the second fixed tube.

16. The projection lens according to claim 15, wherein the first rotary tube rotates with respect to the first fixed tube in a rotatable range of 360° or greater, wherein the second rotary tube rotates with respect to the second fixed tube in a rotatable range of less than 360°, and wherein the second conduction portion is a cable-type conduction portion.

17. The projection lens according to claim 1, comprising:
a rotation-position detection mechanism that detects a rotation position of the first rotary tube,
wherein the rotation-position detection mechanism has a pattern formation portion that is formed by a plurality of patterns that differ at each rotation position, and a photosensor that optically reads the plurality of patterns, and
wherein the pattern formation portion and the photosensor rotate relative to each other as a result of rotating the first rotary tube.

18. A projection device comprising:
the projection lens according to claim 1.

19. A projection lens that is to be mounted on a housing of a projection device having an electro-optical element, the projection lens comprising:
a bending optical system that has a first optical axis for light that is incident from the housing, a second optical axis that is bent with respect to the first optical axis, and a third optical axis that is bent with respect to the second optical axis;
a lens barrel that has a first lens barrel portion through which the first optical axis extends, a second lens barrel portion through which the second optical axis extends, and a third lens barrel portion through which the third optical axis extends and that accommodates an exit optical system from which light exits,
the third lens barrel portion rotating around the second optical axis with respect to the second lens barrel portion,
the second lens barrel portion having a first rotary tube that rotates as a result of rotating the third lens barrel portion and a first fixed tube at which the first rotary tube is rotatably mounted, and rotating around the first optical axis with respect to the first lens barrel portion, and
the first lens barrel portion having a second rotary tube that rotates as a result of rotating the second lens barrel portion and a second fixed tube at which the second rotary tube is rotatably mounted;
a first conduction portion for performing electrical conduction between a side of the first rotary tube and a side of the first fixed tube; and
a second conduction portion for performing electrical conduction between a side of the second rotary tube and a side of the second fixed tube,
wherein the first rotary tube rotates with respect to the first fixed tube in a rotatable range of 360° or greater,
wherein a rotatable range of the second rotary tube with respect to the second fixed tube is less than 360°,
wherein the first conduction portion is a cableless-type conduction portion, and
wherein the second conduction portion is a cable-type conduction portion.

20. A projection device comprising:
the projection lens according to claim 19,
wherein the housing has a central portion, a protrusion portion, and a recessed portion that is adjacent to the protrusion portion, and
wherein the projection lens is disposed in the recessed portion.

* * * * *